US012032399B2

(12) United States Patent
Kim et al.

(10) Patent No.: US 12,032,399 B2
(45) Date of Patent: Jul. 9, 2024

(54) INTEGRATED CIRCUIT AND ELECTRONIC DEVICE INCLUDING THE SAME

(71) Applicant: Samsung Electronics Co., Ltd., Suwon-si (KR)

(72) Inventors: Jungmoon Kim, Suwon-si (KR); Jeongpyo Kim, Seoul (KR); Insuk Kim, Suwon-si (KR); Yeonjeong Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 264 days.

(21) Appl. No.: 17/721,541

(22) Filed: Apr. 15, 2022

(65) Prior Publication Data

US 2022/0334604 A1 Oct. 20, 2022

(30) Foreign Application Priority Data

Apr. 15, 2021 (KR) ........................ 10-2021-0049310
Jun. 22, 2021 (KR) ........................ 10-2021-0081043

(51) Int. Cl.
*G05F 1/575* (2006.01)
*G09G 3/20* (2006.01)

(52) U.S. Cl.
CPC ............... *G05F 1/575* (2013.01); *G09G 3/20* (2013.01); *G09G 2330/021* (2013.01)

(58) Field of Classification Search
CPC ..... G05F 1/575; G09G 3/20; G09G 2330/021
USPC .......................................................... 323/280
See application file for complete search history.

(56) References Cited

U.S. PATENT DOCUMENTS

| | | | | |
|---|---|---|---|---|
| 6,806,690 | B2 * | 10/2004 | Xi | G05F 1/575 323/280 |
| 7,304,458 | B2 | 12/2007 | Kakinuma | |
| 7,508,179 | B2 * | 3/2009 | Cowell | G05F 1/56 323/275 |
| 7,847,530 | B2 | 12/2010 | Takagi | |
| 9,529,374 | B2 * | 12/2016 | Enjalbert | G05F 1/575 |
| 10,534,390 | B2 | 1/2020 | Yasusaka | |
| 10,613,563 | B2 * | 4/2020 | Yasusaka | G05F 1/575 |
| 2016/0231761 | A1 | 8/2016 | Jain et al. | |
| 2021/0141408 | A1 | 5/2021 | Yasusaka | |
| 2021/0333812 | A1 * | 10/2021 | Liu | G05F 1/563 |

FOREIGN PATENT DOCUMENTS

| | | | |
|---|---|---|---|
| JP | 2021-018657 | A | 2/2021 |
| KR | 101796769 | B1 | 11/2017 |
| KR | 10-2022-0037280 | A | 3/2022 |

* cited by examiner

*Primary Examiner* — Yemane Mehari
(74) *Attorney, Agent, or Firm* — Harness, Dickey & Pierce, P.L.C.

(57) ABSTRACT

An integrated circuit includes: a power supply circuit configured to generate a supply voltage from at least one of first and second power source voltages; and a system load configured to operate by receiving the supply voltage through an output node of the power supply circuit, wherein the power supply circuit includes: a first low drop-output (LDO) regulator configured to generate, from the first power source voltage, a first load current flowing to the system load through the output node; and a second LDO regulator configured to selectively generate a second load current flowing to the system load through the output node, from the second power source voltage based on a difference between voltages of internal nodes of the first LDO regulator.

20 Claims, 18 Drawing Sheets

INTEGRATED CIRCUIT AND ELECTRONIC DEVICE INCLUDING THE SAME

CROSS-REFERENCE TO RELATED APPLICATIONS

This application is based on and claims priority under 35 U.S.C. § 119 to Korean Patent Application Nos. 10-2021-0049310, filed on Apr. 15, 2021, and 10-2021-0081043, filed on Jun. 22, 2021, in the Korean Intellectual Property Office, the disclosures of which are incorporated by reference herein in their entireties.

BACKGROUND

The inventive concepts relate to an integrated circuit configured to perform a certain operation, and particularly, to an integrated circuit including a power supply circuit configured to generate a supply voltage to be provided to a system load in the integrated circuit, and an electronic device including the same.

Recently, because an electronic device performs various operations, a current consumption range of the electronic device has been widened. For example, for display devices, along with an increase in a resolution and a scan rate of a display, a maximum value of current consumption of a display driver integrated circuit has continuously increased, thereby resulting in widening a current consumption range. In addition, the current consumption of the display driver integrated circuit may vary in real-time according to various causes such as a characteristic of image data to be processed and an operating mode of a display device.

Accordingly, demand for a method of reducing or preventing unnecessary current consumption by adjusting supply of a current according to a real-time change of current consumption while covering a widened current consumption range has increased.

SUMMARY

The inventive concepts provide an integrated circuit configured to generate a supply voltage by using at least one of a plurality of power source voltages according to a load current drawn by a system load included in the integrated circuit and provide the supply voltage to the system load, and an electronic device including the same.

According to example embodiments of the inventive concepts, there is provided an integrated circuit including: a power supply circuit configured to generate a supply voltage from at least one of first and second power source voltages; and a system load configured to operate by receiving the supply voltage through an output node of the power supply circuit, wherein the power supply circuit includes: a first low drop-output (LDO) regulator configured to generate, from the first power source voltage, a first load current flowing to the system load through the output node; and a second LDO regulator configured to selectively generate a second load current flowing to the system load through the output node, from the second power source voltage based on a difference between voltages of internal nodes of the first LDO regulator.

According to example embodiments of the inventive concepts, there is provided an integrated circuit including: a power supply circuit configured to generate a supply voltage from at least one of first and second power source voltages; and a system load configured to operate by receiving the supply voltage from the power supply circuit and draw a first load current from the power supply circuit, wherein the power supply circuit includes: a first low drop-output (LDO) regulator configured to generate, from the first power source voltage, a second load current flowing to the system load; and a second LDO regulator configured to generate a third load current flowing to the system load, from the second power source voltage in response to a saturated state of the second load current according to an increase in the first load current.

According to example embodiments of the inventive concepts, there is provided an electronic device including: a display driver integrated circuit (hereinafter, DDI); and a power management integrated circuit (hereinafter, PMIC) configured to provide first and second power source voltages to the DDI, wherein the DDI includes: a first logic circuit configured to operate by receiving the first power source voltage; a second logic circuit configured to operate by receiving a supply voltage; and a power supply circuit configured to output the supply voltage from at least one of the first and second power source voltages, wherein the power supply circuit includes: a first low drop-output (LDO) regulator configured to output, from the first power source voltage, a first load current to the second logic circuit; and a second LDO regulator connected to internal nodes of the first LDO regulator and configured to output, from the second power source voltage, a second load current to the second logic circuit when a difference between voltages of the internal nodes is a reference value or more.

According to example embodiments of the inventive concepts, there is provided an integrated circuit including: a first low drop-output (LDO) regulator configured to generate a first load current from a first power source voltage; a second LDO regulator configured to selectively generate a second load current from a second power source voltage; and a system load configured to draw a third load current including at least one of the first and second load currents from an output node shared by the first and second LDO regulators, wherein the first LDO regulator includes: a first current generation circuit configured to generate the first load current by applying the first power source voltage thereto; and a first comparison circuit configured to generate a first enable control signal by comparing a reference voltage with a feedback voltage corresponding to a voltage of the output node and provide the first enable control signal to the first current generation circuit, and the second LDO regulator includes: a second current generation circuit configured to generate the second load current by applying the second power source voltage thereto; and a second comparison circuit connected to internal nodes of the first comparison circuit and configured to generate a second enable control signal by comparing voltages of the internal nodes and provide the second enable control signal to the second current generation circuit.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Figure 1:
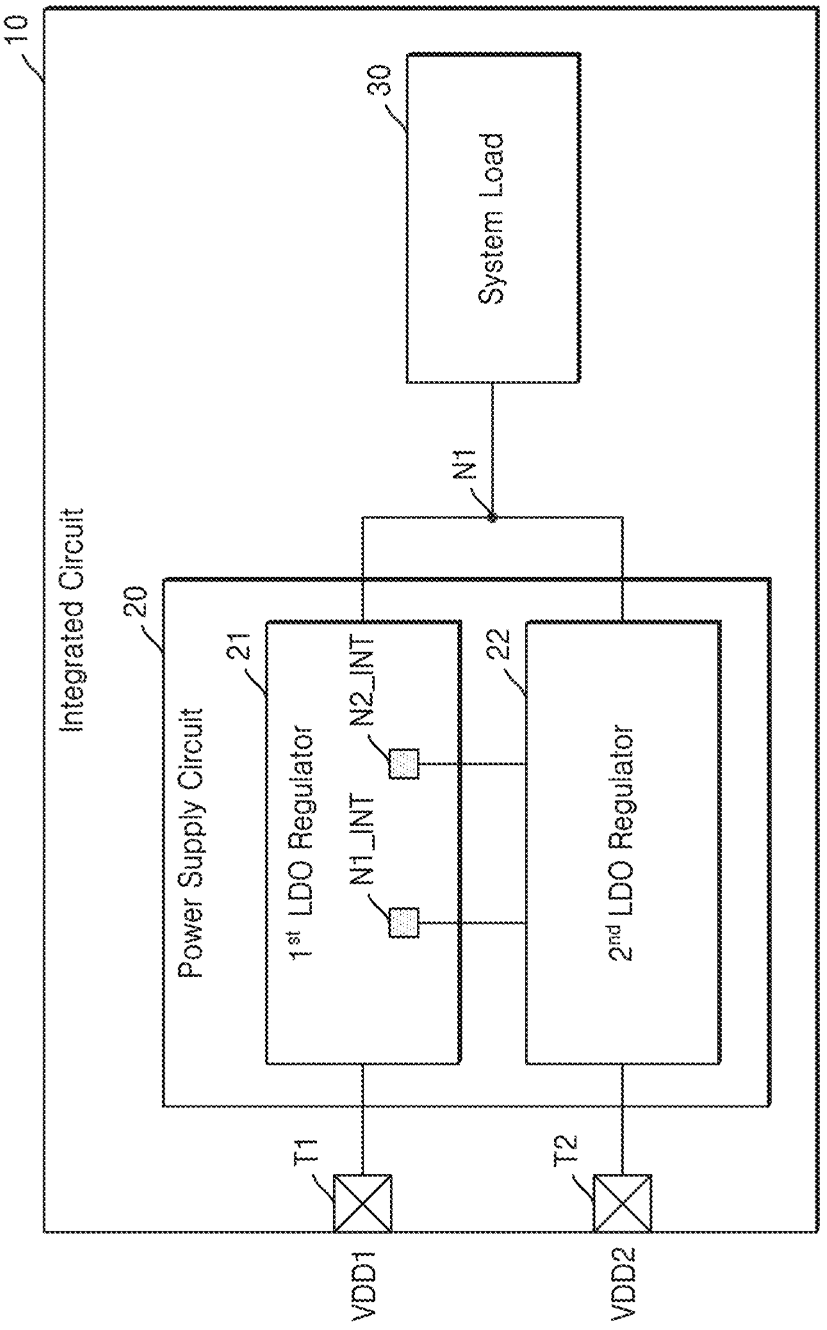
FIG. 1 is a block diagram of an integrated circuit according to example embodiments of the inventive concepts.

FIG. 1 is a block diagram of an integrated circuit 10 according to example embodiments of the inventive concepts. In the specification, the integrated circuit 10 may be included in an electronic device (not shown) to perform a certain operation required for the electronic device. The integrated circuit 10 may be implemented by a single independent chip in the electronic device (not shown) or implemented by being linked to another circuit in the electronic device (not shown). For example, the electronic device (not shown) may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, mobile medical equipment, a camera, and a wearable device (e.g., a head-mounted device (HMD) such as electronic glasses, electronic clothing, an electronic bracelet, an electronic necklace, an electronic appcessory, an electronic tattoo, or a smart watch).

According to some example embodiments, the electronic device may be a smart home appliance having an image display function. The smart home appliance may include at least one of, for example, a television (TV), a digital video disk (DVD) player, an audio player, a refrigerator, an air conditioner, a cleaner, an oven, a microwave oven, a washer, an air cleaner, a set-top box, a TV box (e.g., Samsung HomeSync™, Apple TV™, or Google TV™), a game console, an electronic dictionary, an electronic key, a camcorder, and an electronic frame.

According to some example embodiments, the electronic device may include at least one of various kinds of medical devices (e.g., a magnetic resonance angiography (MRA) machine, a magnetic resonance imaging (MRI) machine, a computed tomography (CT) machine, an imaging machine, an ultrasonic machine, and/or the like), a navigation device, a global positioning system (GPS) receiver, an event data recorder (EDR), a flight data recorder (FDR), a vehicle infotainment device, marine electronic equipment (e.g., a marine navigation device, a gyrocompass, and/or the like), avionics, a security device, a vehicle head unit, an industrial or home robot, an automatic teller machine (ATM) of a financial institution, and a point of sales (POS) in a store.

According to some example embodiments, the electronic device may include at least one of furniture or a portion of a building/structure, which includes an image display function, an electronic board, an electronic signature receiving device, a projector, and various kinds of meters (e.g., a water meter, an electric meter, a gas meter, a radio wave meter, and/or the like). The electronic device according example embodiments of the inventive concepts may be one or a combination of the various devices described above. Alternatively, the electronic device may be a flexible display device.

Referring to FIG. 1, the integrated circuit 10 may include a first terminal T1, a second terminal T2, a power supply circuit 20, and/or a system load 30. A first power source voltage VDD1 may be applied to the first terminal T1, and a second power source voltage VDD2 may be applied to the second terminal T2.

The power supply circuit 20 may receive at least one of the first and second power source voltages VDD1 and VDD2 through the first and second terminals T1 and T2 and generate a supply voltage required to drive the system load 30. The power supply circuit 20 may provide the supply voltage to the system load 30 through an output node N1. In example embodiments, the first and second power source voltages VDD1 and VDD2 may have the same or different magnitudes as independent power source voltages that are different from each other. In some example embodiments, the first power source voltage VDD1 may be generated from the second power source voltage VDD2. In the specification, it may be understood that a voltage of the output node N1 is the same as the supply voltage provided to the system load 30.

The system load 30 may operate in a plurality of operating regions according to magnitudes of power consumption. An operating region may be defined according to power consumption of the system load 30. For example, the system load 30 may operate in a first operating region in which relatively low power is consumed or in a second operating region in which relatively high power is consumed. In some example embodiments, an operating region may be defined by additionally considering process, voltage, and temperature (PVT) conditions of the system load 30. When the system load 30 operates in the first operating region, a first load current drawn from the output node N1 may be relatively small, and when the system load 30 operates in the second operating region, the first load current drawn from the output node N1 may be relatively large. The system load 30 may consume high power in a particular operating region, and in some example embodiments, the first load current of a high level may be instantaneously drawn from the output node N1. When balance between a magnitude of a load current provided from the power supply circuit 20 to the output node N1 and a magnitude of the first load current drawn by the system load 30 is lost, the voltage of the output node N1 (e.g., the supply voltage to the system load 30) may change so that the system load 30 does not smoothly operate. To solve this problem, the power supply circuit 20 according to example embodiments of the inventive concepts is described below.

The power supply circuit 20 may include a first low drop-output (LDO) regulator 21 and at least one second LDO regulator 22. In example embodiments, the first LDO regulator 21 may receive the first power source voltage VDD1 through the first terminal T1 and generate, from the first power source voltage VDD1, a second load current flowing to the system load 30 through the output node N1. The first LDO regulator 21 may generate the second load current matched with power consumption of the system load 30. For example, as power consumption of the system load 30 increases, the first load current drawn from the output node N1 may increase, and the first LDO regulator 21 may generate the second load current from the first power source voltage VDD1 in response to the increased first load current. When the magnitude of the first load current exceeds a threshold value, the second load current generated by the first LDO regulator 21 reaches a saturated state, and after the saturated state, the magnitude of the first load current may be greater than a magnitude of the second load current. In some example embodiments, the second LDO regulator 22 may generate a third load current for compensating for a difference between the first load current, which is continuously increasing, and the second load current, which is saturated.

In example embodiments, the second LDO regulator 22 may receive the second power source voltage VDD2 through the second terminal T2 and generate, from the second power source voltage VDD2, the third load current flowing to the system load 30 through the output node N1. In example embodiments, when the magnitude of the first load current of the system load 30 exceeds the threshold value, e.g., when the system load 30 operates in the particular operating region, the saturated second load current may be generated by using the first LDO regulator 21, the third load current may be generated by using the second LDO regulator 22, and the saturated second load current and the third load current may be output to the system load 30. In example embodiments, a magnitude of the first power source voltage VDD1 may be less than a magnitude of the second power source voltage VDD2. In some example embodiments, the magnitude of the first power source voltage VDD1 may be the same as the magnitude of the second power source voltage VDD2.

In example embodiments, the second LDO regulator 22 may be connected to first and second internal nodes N1_INT and N2_INT of the first LDO regulator 21 to selectively generate the third load current based on a difference between voltages of the first and second internal nodes N1_INT and N2_INT. That is, the second LDO regulator 22 may start to generate the third load current by determining the saturated state of the second load current of the first LDO regulator 21 based on the voltages of the first and second internal nodes N1_INT and N2_INT.

In example embodiments, the voltages of the first and second internal nodes N1_INT and N2_INT may vary in response to drop of the supply voltage (or the voltage of the output node N1) according to an increase of the first load current drawn by the system load 30 to the threshold value or higher. In addition, in response to the drop of the supply voltage, the voltage of the first internal node N1_INT may increase, and the voltage of the second internal node N2_INT may decrease. In some example embodiments, in response to the drop of the supply voltage, the voltage of the first internal node N1_INT may decrease, and the voltage of the second internal node N2_INT may increase. In example embodiments, each of the first and second internal nodes N1_INT and N2_INT may output a difference between a reference voltage applied to the first LDO regulator 21 and a feedback voltage matched with the supply voltage.

The second LDO regulator 22 may directly receive the voltages of the first and second internal nodes N1_INT and N2_INT, which indicate whether the supply voltage has dropped, from the first LDO regulator 21, thereby reducing or minimizing a structure of a comparison circuit required to detect drop of the supply voltage.

In example embodiments, the second LDO regulator 22 may include a plurality of auxiliary current generation circuits (not shown), each configured to generate an auxiliary current included in the third load current. The second LDO regulator 22 may determine the number of auxiliary current generation circuits to be enabled according to an operating region of the system load 30 or the magnitude of the first load current of the system load 30, and the enabled auxiliary current generation circuits may generate the auxiliary current. The auxiliary current generation circuits may be referred to as auxiliary current paths, and a particular example embodiment thereof is described with reference to FIG. 8A and/or the like.

The integrated circuit 10 according to example embodiments of the inventive concepts may provide a stable supply voltage to the system load 30 by using the first and second LDO regulators 21 and 22 even in various operating regions of the system load 30, and the second LDO regulator 22 may directly receive, from the first LDO regulator 21, a signal required to selectively generate a load current, thereby relatively simplifying a circuit structure.

Figure 2:
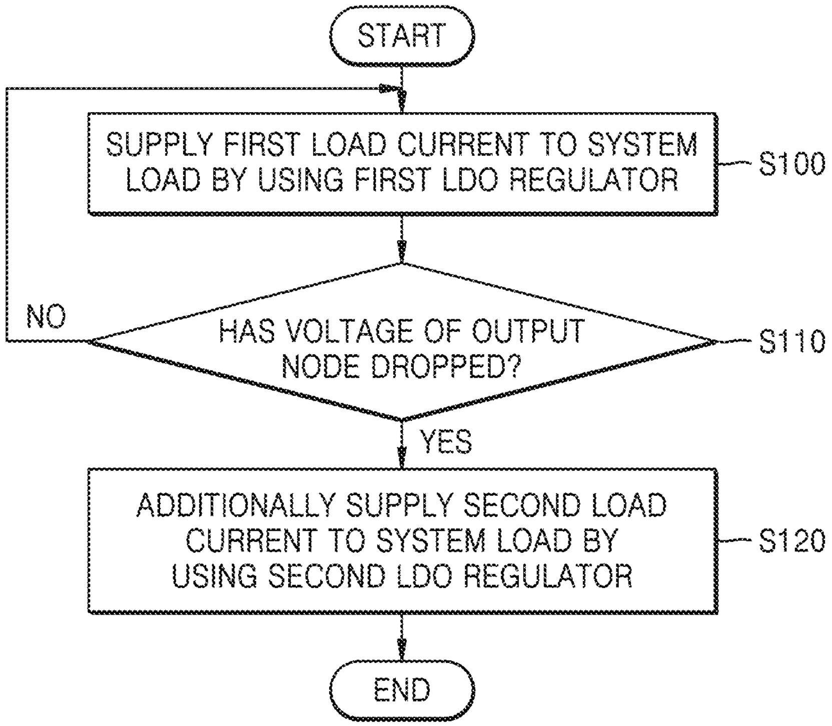
FIG. 2 is a flowchart of an operating method of an integrated circuit, according to example embodiments of the inventive concepts.

FIG. 2 is a flowchart of an operating method of an integrated circuit, according to example embodiments of the inventive concepts.

Referring to FIG. 2, in operation S100, the integrated circuit may supply a first load current to a system load by using a first LDO regulator. For example, the first LDO regulator may supply the first load current to the system load through an output node, and a voltage of the output node is a supply voltage and may be based on driving the system load. In operation S110, the integrated circuit may detect whether the voltage of the output node has dropped. In other words, in operation S110, the integrated circuit may detect whether the supply voltage to be provided to the system load has dropped. For example, a second LDO regulator of the integrated circuit may be connected to internal nodes of the first LDO regulator to check whether the voltage of the output node has dropped, based on a difference between voltages of the internal nodes. As described above, the drop of the supply voltage may occur due to imbalance between the first load current which is saturated and a third load current which is increasing when the first load current supplied from the first LDO regulator reaches the saturated state due to a continuous or sharp increase in the third load current drawn by the system load from the output node.

When operation S110 indicates 'YES', to reduce or prevent a continuous drop of the supply voltage, the integrated circuit may additionally supply a second load current to the system load by using the second LDO regulator in operation S120. The second LDO regulator shares the output node with the first LDO regulator and may supply the second load current to the system load through the output node. The second LDO regulator may generate the second load current that is proportional to a difference between the third load current drawn by the system load and the saturated first load current. By doing this, the second LDO regulator may provide the second load current immediately in response to the drop of the supply voltage, thereby reducing or minimizing a drop degree of the supply voltage and guaranteeing a stable operation of the system load. Otherwise, when operation S110 indicates 'NO', operation S100 may be performed thereafter.

In some example embodiments, in operation S110, the integrated circuit may detect whether a drop degree of the voltage of the output node is a reference degree or more. For example, the second LDO regulator of the integrated circuit may detect whether the difference between the voltages of the internal nodes of the first LDO regulator is a reference value or more. Thereafter, in operation S120, the second LDO regulator may generate the second load current when the difference between the voltages of the internal nodes is the reference value or more. By doing this, the second LDO regulator may delay a generation start time of the second load current by a certain time from a time point where the first load current reaches the saturated state, thereby avoiding an increase in ripples or noise due to overlapping of operations of the first LDO regulator and the second LDO regulator.

Figure 3:
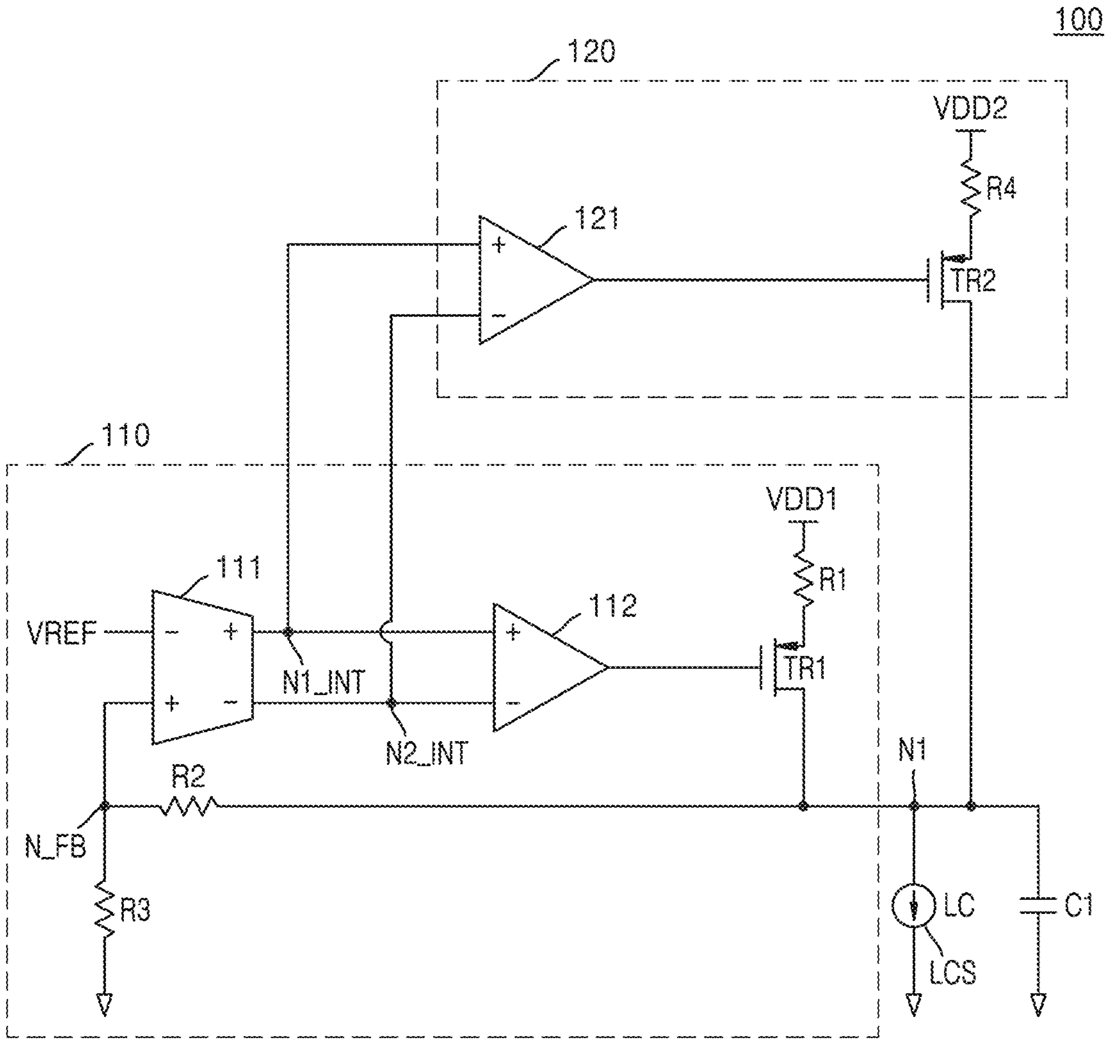
FIG. 3 is a circuit diagram of a power supply circuit according to example embodiments of the inventive concepts.

FIG. 3 is a circuit diagram of a power supply circuit 100 according to example embodiments of the inventive concepts. In FIG. 3, a load current source LCS may indicate a load current drawn by a system load The power supply circuit 100 shown in FIG. 3 is merely an example for describing the technical ideas of the inventive concepts, and thus, the inventive concepts are not limited thereto, and it will be sufficiently understood that implementation examples of the power supply circuit 100 may be various ones.

Referring to FIG. 3, the power supply circuit 100 may include a first LDO regulator 110 and at least one second LDO regulator 120. In addition, in a non-limiting example, the power supply circuit 100 may further include a first capacitor C1 connected between the output node N1 and the ground, for a stable operation.

In example embodiments, the first LDO regulator 110 may include first to third resistors R1, R2, and R3, a first transistor TR1, a first comparator 111, and/or a second comparator 112. In the specification, the first comparator 111 and the second comparator 112 may be defined as elements included in a first comparison circuit of the first LDO regulator 110. In addition, the first resistor R1 and the first transistor TR1 may be defined as elements included in a first current generation circuit configured to generate a first load current by using the first power source voltage VDD1. The first transistor TR1 may be a p-channel metal-oxide-semiconductor field-effect transistor (MOSFET). In some example embodiments, the first transistor TR1 may be a power transistor.

One end of the first resistor R1 may be connected to a terminal through which the first power source voltage VDD1 is received, and the other end thereof may be connected to a source terminal of the first transistor TR1. A drain terminal of the first transistor TR1 may be connected to the output node N1. One end of the second resistor R2 may be connected to the output node N1, and the other end thereof may be connected to a feedback node N_FB. One end of the third resistor R3 may be connected to the feedback node N_FB, and the other end thereof may be connected to the ground. A voltage of the feedback node N_FB is a feedback voltage and may be determined by a voltage of the output node N1 (or a supply voltage) and a resistance value ratio of the second resistor R2 to the third resistor R3.

Input terminals of the first comparator 111 may be connected to a terminal through which a reference voltage VREF is received and the feedback node N_FB. Output terminals of the first comparator 111 may be connected to input terminals of the second comparator 112 through the first and second internal nodes N1_INT and N2_INT. An output terminal of the second comparator 112 may be connected to a gate terminal of the first transistor TR1.

The second LDO regulator 120 may include a fourth resistor R4, a second transistor TR2, and/or a third comparator 121. In the specification, the third comparator 121 may be defined as an element included in a second comparison circuit of the second LDO regulator 120. In addition, the fourth resistor R4 and the second transistor TR2 may be defined as elements included in a second current generation circuit configured to generate a second load current by using the second power source voltage VDD2. The second transistor TR2 may be a p-channel MOSFET. In some example embodiments, the second transistor TR2 may be a power transistor.

One end of the fourth resistor R4 may be connected to a terminal through which the second power source voltage VDD2 is received, and the other end thereof may be connected to a source terminal of the second transistor TR2. A drain terminal of the second transistor TR2 may be connected to the output node N1. Input terminals of the third comparator 121 may be connected to the first and second internal nodes N1_INT and N2_INT. An output terminal of the third comparator 121 may be connected to a gate terminal of the second transistor TR2.

Hereinafter, an operation of the power supply circuit 100 of FIG. 3 is described with reference to FIGS. 4A to 4C.

Figure 4A:
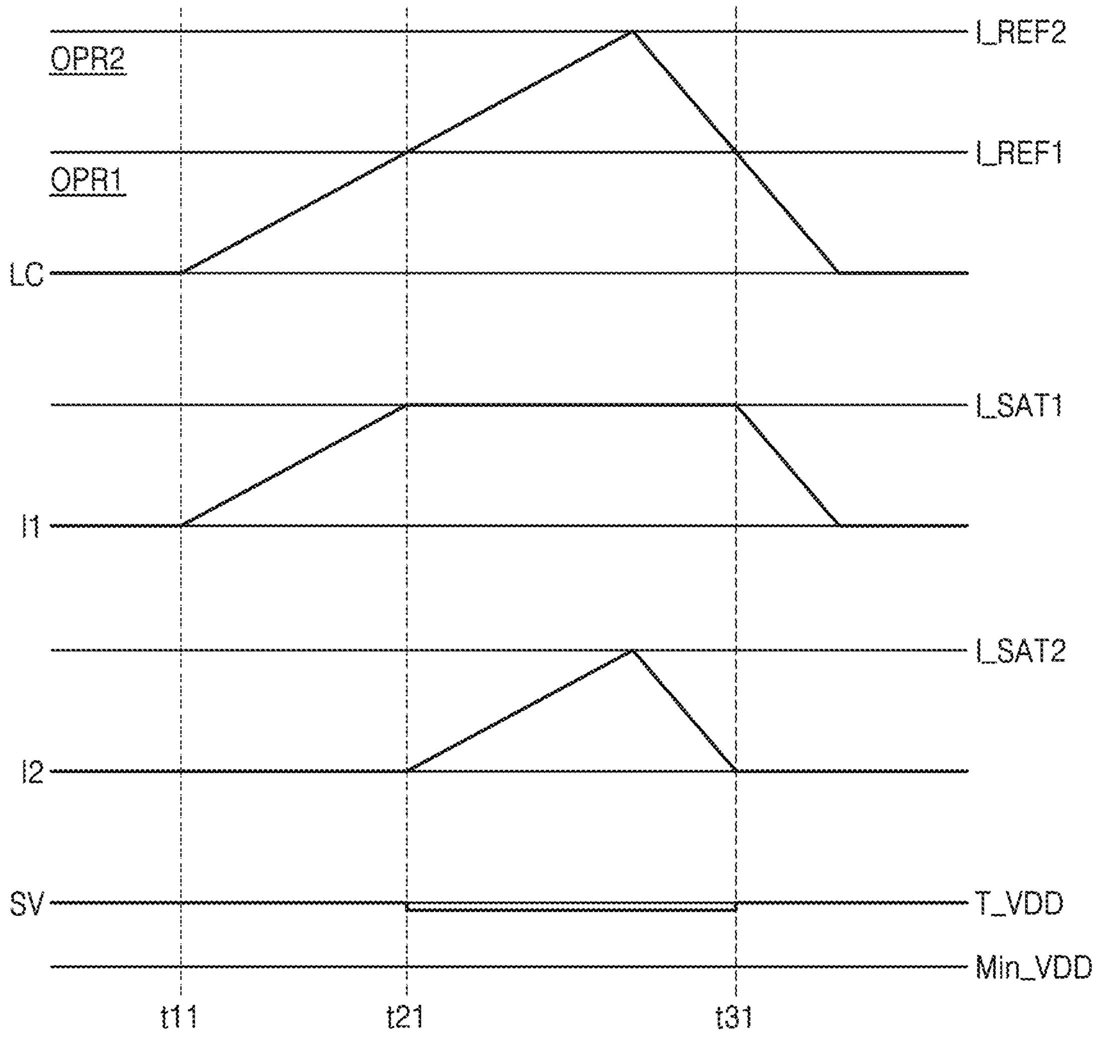
FIG. 4A is a timing diagram indicating an operation of a power supply circuit, according to example embodiments of the inventive concepts.
Figure 4B:
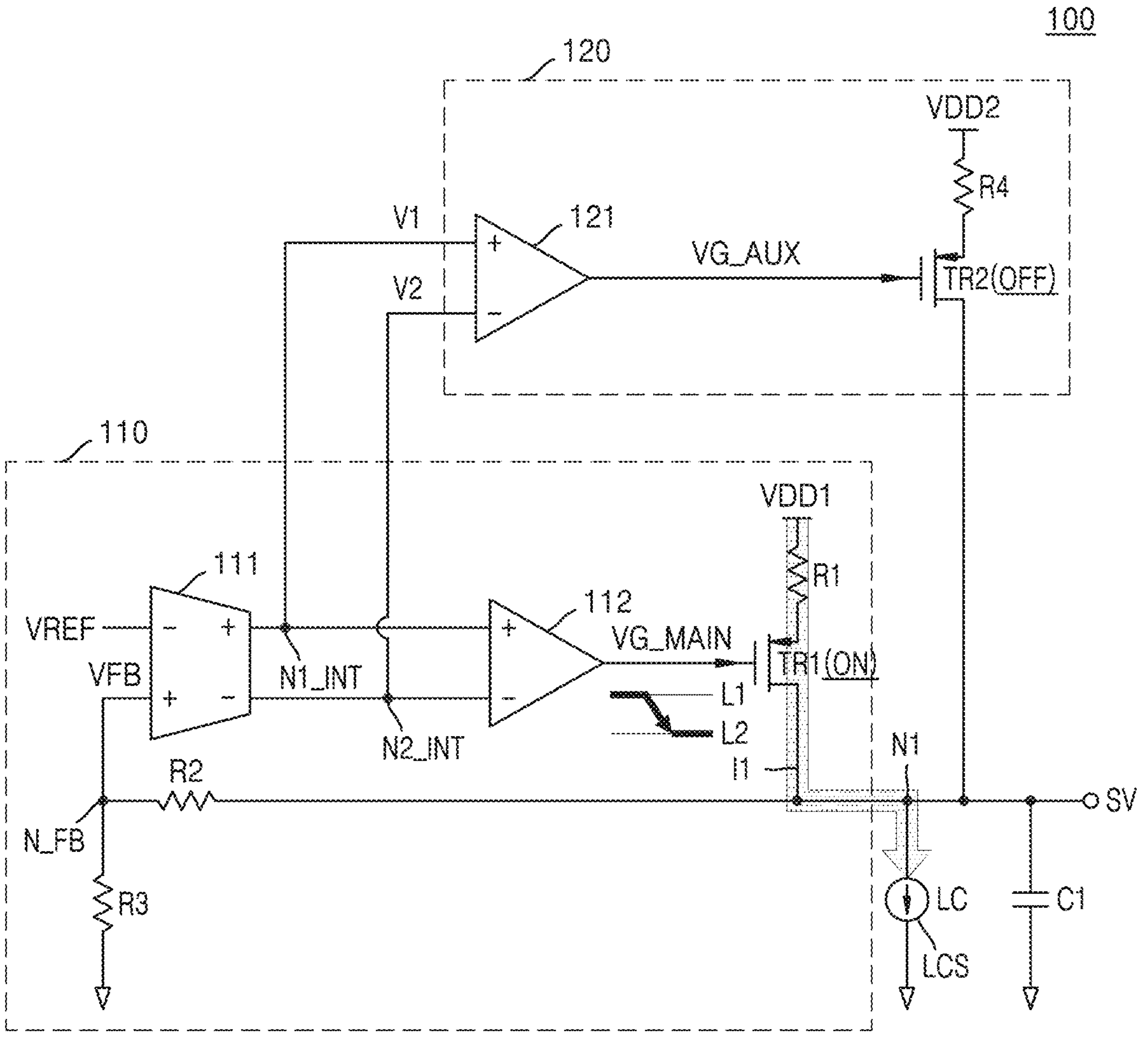
FIGS. 4B and 4C are circuit diagrams for describing an operation of the power supply circuit, according to example embodiments of the inventive concepts.
Figure 4C:
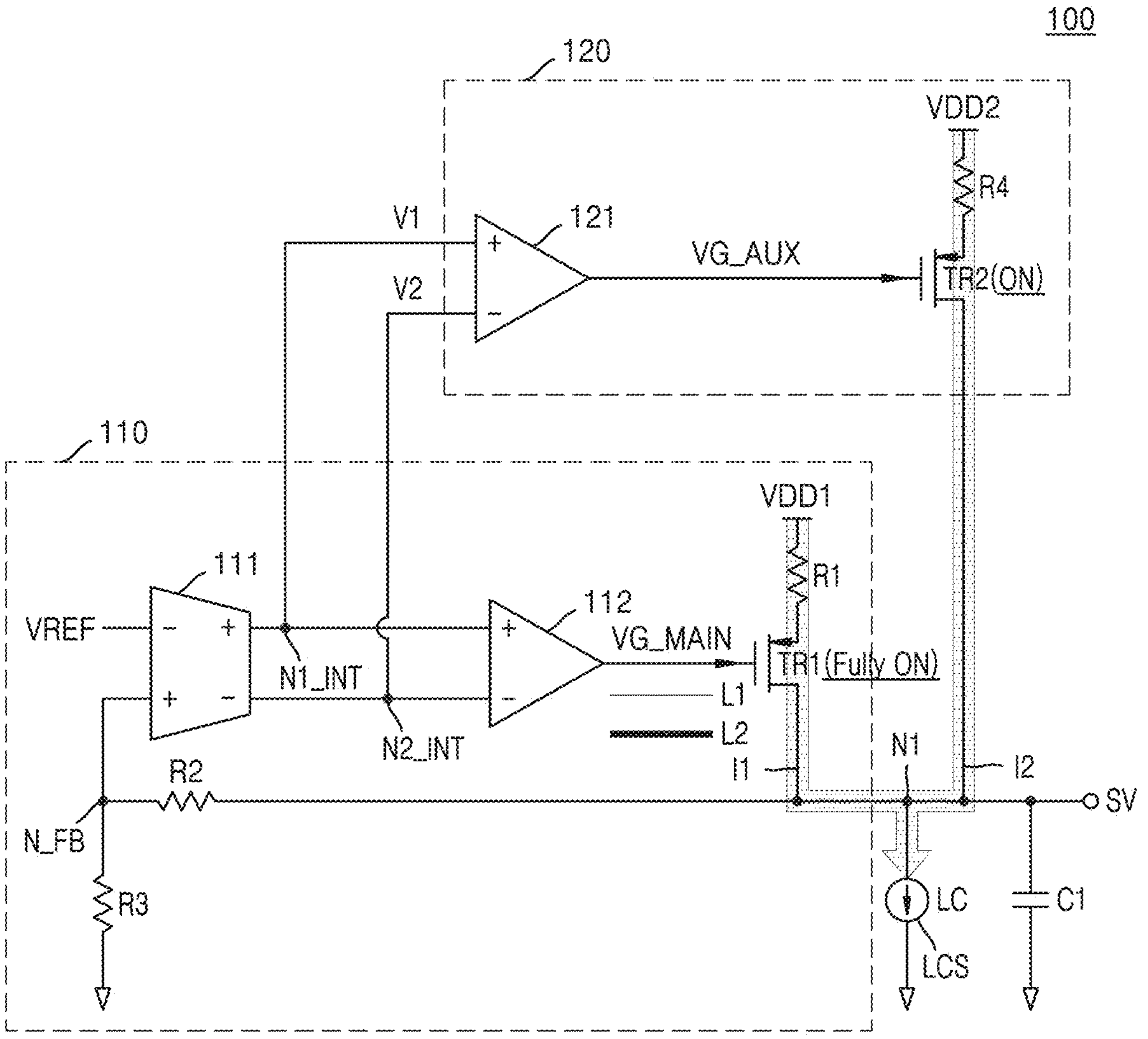

FIG. 4A is a timing diagram indicating an operation of the power supply circuit 100, according to example embodiments of the inventive concepts, and FIGS. 4B and 4C are circuit diagrams for describing an operation of the power supply circuit 100, according to example embodiments of the inventive concepts.

The power supply circuit 100 may perform an operation shown in FIG. 4B in a period between a first time point t11 and a second time point t21 and a period after a third time point t31 and perform an operation shown in FIG. 4C in a period between the second time point t21 and the third time point t31.

Referring to FIG. 4A, a load current LC may indicate a current drawn by the load current source LCS (see FIGS. 4B and 4C) from the output node N1 (see FIGS. 4B and 4C), a first load current I1 may indicate a current generated by the first LDO regulator 110 (see FIGS. 4B and 4C), a second load current I2 may indicate a current generated by the second LDO regulator 120 (see FIGS. 4B and 4C), and a supply voltage SV may indicate a voltage of the output node N1 (see FIGS. 4B and 4C). First and second reference currents I_RFE1 and I_REF2 may be references for defining first and second operating regions OPR1 and OPR2 of a system load. A first saturated current I_SAT1 may indicate the first load current I1, which is saturated, and a second saturated current I_SAT2 may indicate the second load current I2, which is saturated. In addition, a target power source voltage T_VDD may indicate a voltage of the supply voltage SV, which has a target level, and a minimum power source voltage Min_VDD may indicate a voltage by which the system load has an operable minimum voltage level.

In the period between the first time point t11 and the second time point t21 or the period after the third time point t31, the system load may operate in the first operating region OPR1, and an increase in power consumption of the system load may cause the load current LC to increase. In response to the increased load current LC, the first load current I1 may also increase. Because it is before the first load current I1 is saturated, the second load current I2 may not be generated, and the supply voltage SV may not drop.

Further referring to FIG. 4B, in the period between the first time point t11 and the second time point t21 or the period after the third time point t31, the first comparator 111 may receive the reference voltage VREF and a feedback voltage VFB and respectively output first and second voltages V1 and V2 indicating a comparison result. Because the supply voltage SV does not drop, the reference voltage VREF and the feedback voltage VFB may have the same magnitude, and the second comparator 112 may generate a first gate voltage VG_MAIN in response to the first and second voltages V1 and V2 and provide the first gate voltage VG_MAIN to the gate terminal of the first transistor TR1. The first transistor TR1 may be turned on in response to the first gate voltage VG_MAIN, generate the first load current I1 from the first power source voltage VDD1, and supply the first load current I1 to the output node N1. The first gate voltage VG_MAIN may have a second level L2 decreased from a first level as the load current LC increases. Before the first load current I1 is saturated, a difference between the first and second voltages V1 and V2 does not occur, and thus, the second LDO regulator 120 may be disabled.

Referring back to FIG. 4A, in the period between the second time point t21 and the third time point t31, the system load may operate in the second operating region OPR2, and an increase in power consumption of the system load may cause the load current LC to increase. Because the first load current I1 is saturated at the second time point t21, the second load current I2 matched with the load current LC may be generated, and drop of the supply voltage SV may be reduced or minimized.

Further referring to FIG. 4C, in the period between the second time point t21 and the third time point t31, the second comparator 112 may provide the first gate voltage VG_MAIN of the second level L2 to the gate terminal of the first transistor TR1, and the first transistor TR1 may be fully turned on in response to the first gate voltage VG_MAIN. The first transistor TR1, which is fully turned on, may generate the first load current I1 matched with the first saturated current I_SAT1 and supply the first load current I1 to the output node N1. The supply voltage SV may instantaneously drop due to the load current LC that is greater than the first load current I1, which is saturated, so that the feedback voltage VFB is less than the reference voltage VREF. The first comparator 111 may receive the reference voltage VREF and the feedback voltage VFB and respectively output the first and second voltages V1 and V2 indicating a comparison result. For example, the first voltage V1 is a voltage of the first internal node N1_INT and may increase as the feedback voltage VFB is less than the reference voltage VREF, and the second voltage V2 is a voltage of the second internal node N2_INT and may decrease as the feedback voltage VFB is less than the reference voltage VREF. The third comparator 121 may compare the first and second voltages V1 and V2, generate a second gate voltage VG_AUX based on a comparison result, and provide the second gate voltage VG_AUX to the gate terminal of the second transistor TR2. The second transistor TR2 may be turned on in response to the second gate voltage VG_AUX, generate the second load current I2 from the second power source voltage VDD2, and supply the second load current I2 to the output node N1. As described above, the system load (not shown) may receive the first and second load currents I1 and I2 through the output node N1, and as a result, drop of the supply voltage SV may be reduced or prevented.

Figure 5:
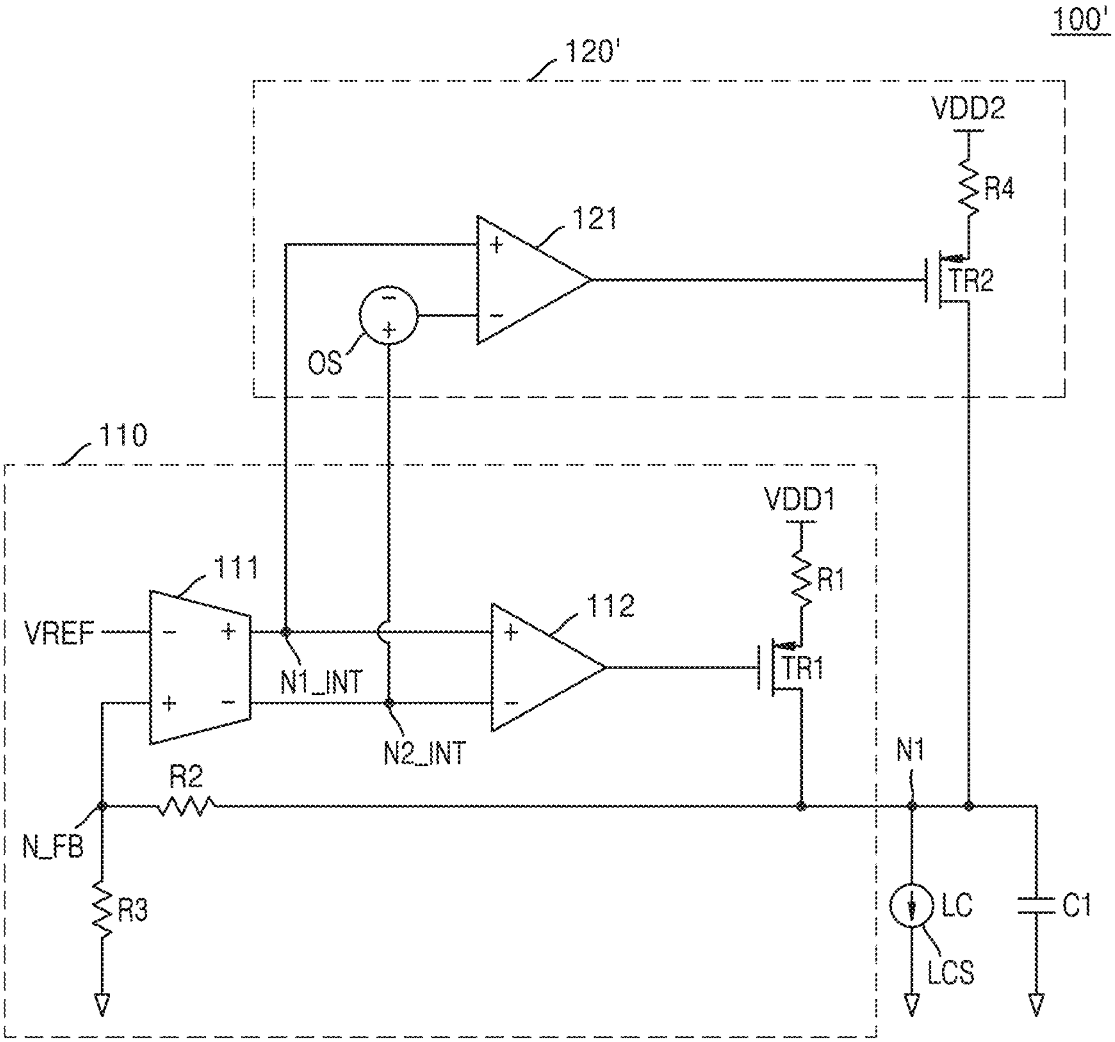
FIG. 5 is a circuit diagram of a power supply circuit according to example embodiments of the inventive concepts.
Figure 6:
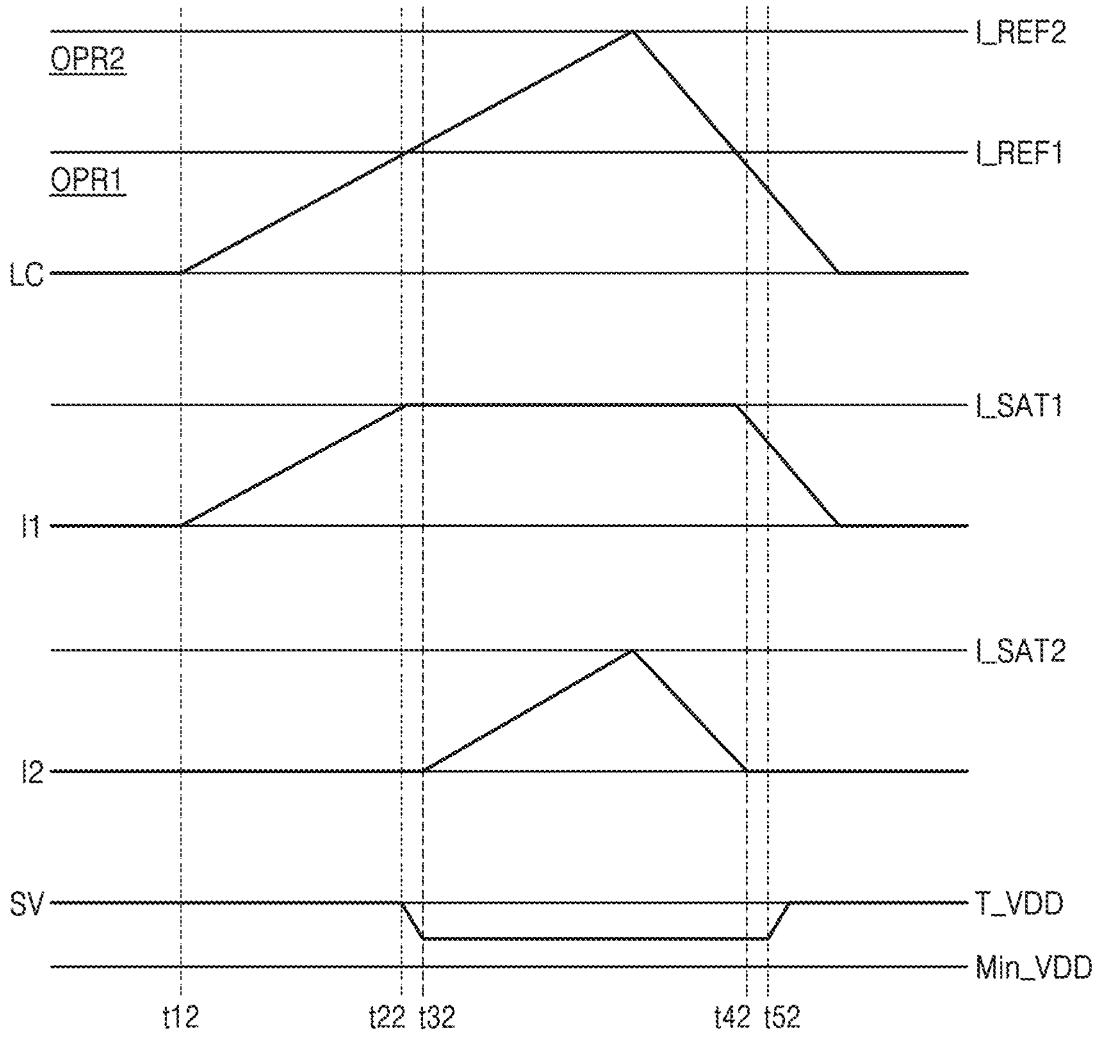
FIG. 6 is a timing diagram indicating an operation of the power supply circuit of FIG. 5.

FIG. 5 is a circuit diagram of a power supply circuit 100' according to example embodiments of the inventive concepts, and FIG. 6 is a timing diagram indicating an operation of the power supply circuit 100' of FIG. 5. As shown in FIG. 5, the power supply circuit 100' may include the first LDO regulator 110 and a second LDO regulator 120'. In FIG. 5, a description made of the power supply circuit 100 of FIG. 3 is not repeated.

As described above, if the second LDO regulator 120' generates a second load current as soon as a first load current of the first LDO regulator 110 reaches the saturated state, ripples, noise, and/or the like may overlap due to instantaneous overlapping of operations of the first and second LDO regulators 110 and 120', thereby inducing unnecessary power consumption.

Referring to FIG. 5, the second LDO regulator 120' may further include an offset voltage source OS to reduce or prevent the unnecessary power consumption. That is, the offset voltage source OS may delay generation start timing of the second load current of the second LDO regulator 120'. However, the second LDO regulator 120' including the offset voltage source OS is merely an example embodiment, and thus, the inventive concepts are not limited thereto, and a circuit configured to perform the same operation as that of the offset voltage source OS may be included in the second LDO regulator 120'. A particular example embodiment thereof is described below with reference to FIG. 11.

In example embodiments, the third comparator 121 may receive a first voltage of the first internal node N1_INT and a second voltage in which an offset voltage of the offset voltage source OS is added to a voltage of the second internal node N2_INT. For example, when the first voltage is greater than the second voltage, the third comparator 121 may generate the second load current through the second transistor TR2.

Further referring to FIG. 6, in a period between a first time point t12 and a second time point t22, a system load may operate in the first operating region OPR1, and as power consumption increases, the load current LC may increase. The first load current I1 may increase in response to the increase in the load current LC and be saturated to the first saturated current I_SAT1 at the second time point t22. After the second time point t22, the system load may operate in the second operating region OPR2. The second LDO regulator 120' may start to generate the second load current I2 at a third time point t32 delayed from the second time point t22 by a degree of delay matched with the offset voltage of the offset voltage source OS. A sum of the saturated first load current I1 and the additional second load current I2 may be balanced with the load current LC, and accordingly, the supply voltage SV may maintain a certain magnitude in a period between the third time point t32 and a fourth time point t42. After the fourth time point t42, the second LDO regulator 120' may be disabled, and the system load may operate in the first operating region OPR1 again, so that the supply voltage SV is recovered to the target power source voltage T_VDD from a fifth time point t52.

Figure 7:
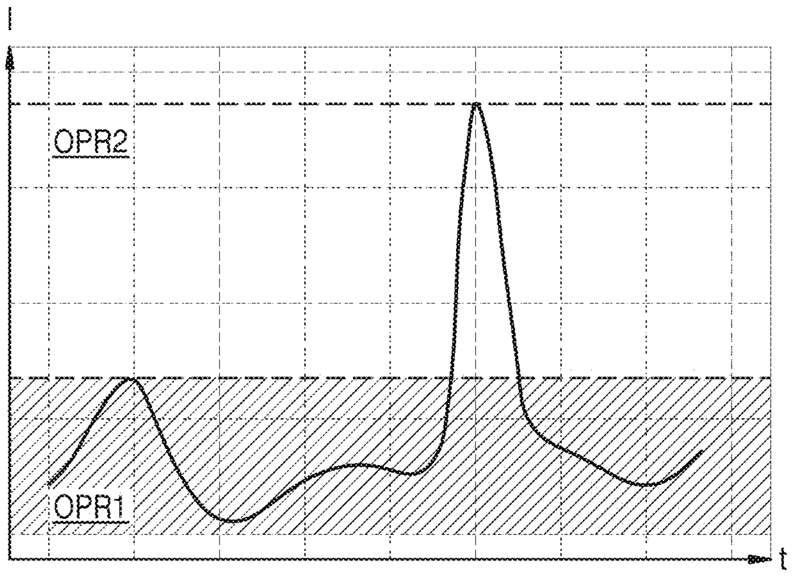
FIG. 7 is a graph indicating a trend of a load current of a system load, according to example embodiments of the inventive concepts.

FIG. 7 is a graph indicating a trend of a load current of a system load, according to example embodiments of the inventive concepts.

Referring to FIG. 7, the system load may operate in any one of the first and second operating regions OPR1 and OPR2. The system load may have a magnitude of consumed power, which varies according to the number of simultaneously operating internal intellectual properties (IPs) among internal IPs. For example, as the number of simultaneously operating internal IPs increases, power consumption of the system load may increase, and accordingly, a load current drawn by the system load may increase.

Most of the time, the system load may operate in the first operating region OPR1, and an integrated circuit according to example embodiments may supply a first load current to the system load by using only a first LDO regulator. In a limited time, the system load may operate in the second operating region OPR2, and the integrated circuit according to example embodiments may supply first and second load currents to the system load by additionally using a second LDO regulator together with the first LDO regulator.

The first and second operating regions OPR1 and OPR2 according to example embodiments of the inventive concepts may be determined by considering an operating frequency of the system load so that efficient power consumption of a power management circuit is possible.

Figure 8A:
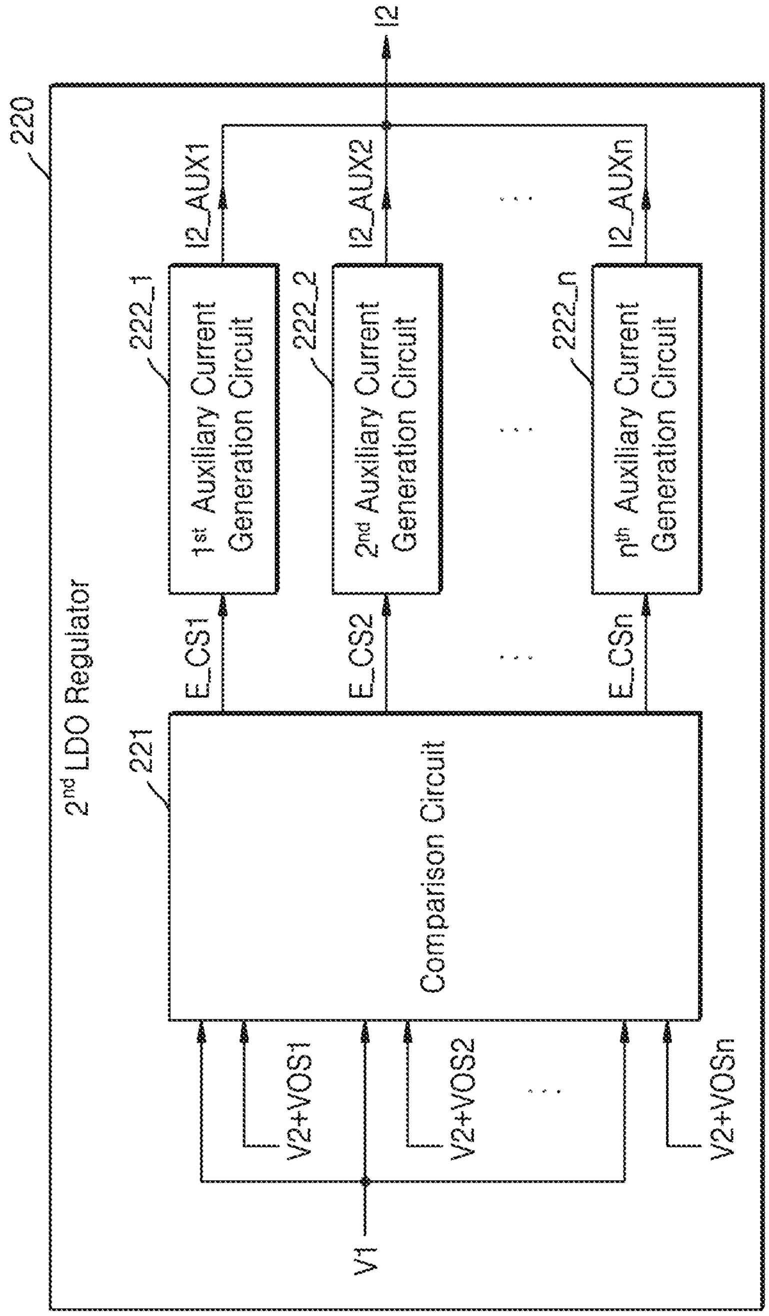
FIG. 8A is a block diagram of a second low drop-output (LDO) regulator according to example embodiments of the inventive concepts.
Figure 8B:
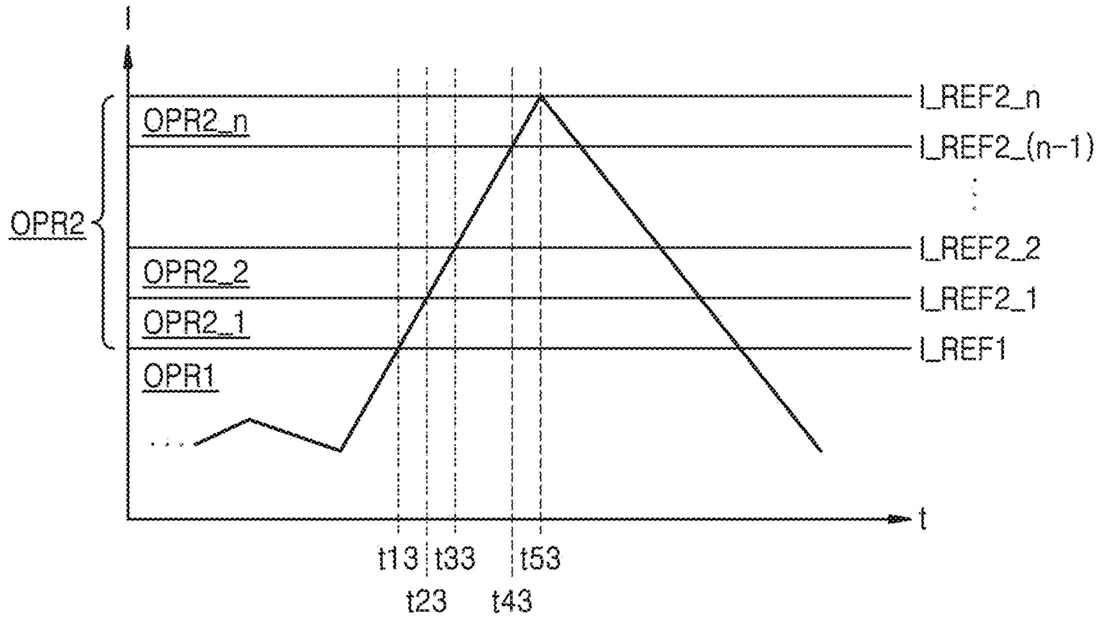
FIG. 8B is a graph for describing an operation of the second LDO regulator of FIG. 8A according to an operating region of a system load.
Figure 8C:
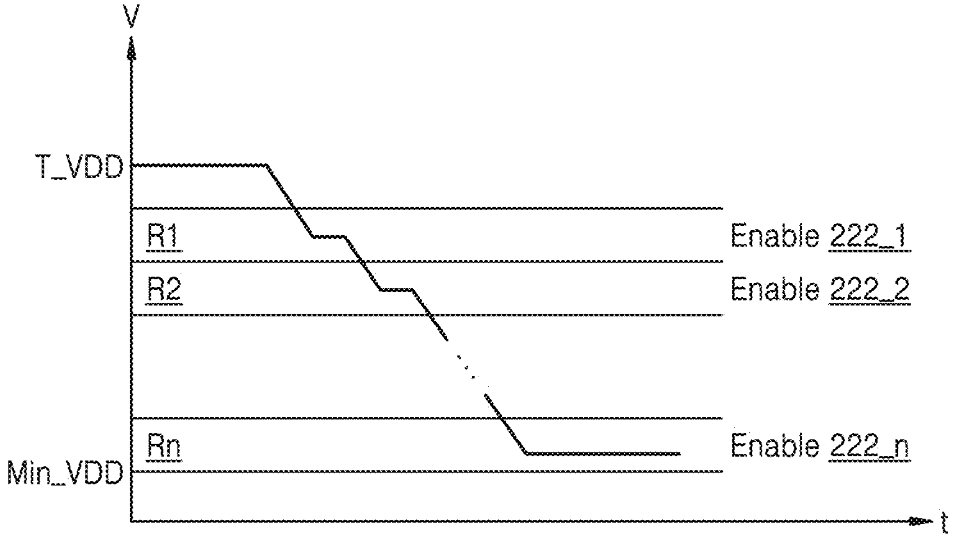
FIG. 8C is a graph for describing a supply voltage according to an operation of the second LDO regulator of FIG. 8A.

FIG. 8A is a block diagram of a second LDO regulator 220 according to example embodiments of the inventive concepts, FIG. 8B is a graph for describing an operation of the second LDO regulator 220 of FIG. 8A according to an operating region of a system load, and FIG. 8C is a graph for describing a supply voltage according to an operation of the second LDO regulator 220 of FIG. 8A.

Referring to FIG. 8A, the second LDO regulator 220 may include a comparison circuit 221 and/or first to nth auxiliary current generation circuits 222_1 to 222_*n*. The first to nth auxiliary current generation circuits 222_1 to 222_*n* may generate first to nth auxiliary currents I2_AUX1 to I2_AUXn, respectively, by being selectively enabled according to a magnitude of the load current LC (see FIG. 3) of the system load.

In example embodiments, the number of enabled auxiliary current generation circuits among the first to nth auxiliary current generation circuits 222_1 to 222_*n* may be determined according to a magnitude of the load current LC (see FIG. 3) of the system load. For example, as the load current LC (see FIG. 3) of the system load increases, the number of enabled auxiliary current generation circuits may increase.

In example embodiments, the comparison circuit 221 may generate a first enable control signal E_CS1 by comparing the first voltage V1 received from the first internal node N1_INT (see FIG. 3) and a voltage in which a first offset voltage VOS1 is added to the second voltage V2 of the second internal node N2_INT (see FIG. 3), and then provide the first enable control signal E_CS1 to the first auxiliary current generation circuit 222_1. The comparison circuit 221 may generate a second enable control signal E_CS2 by comparing the first voltage V1 to a voltage in which a second offset voltage VOS2 is added to the second voltage V2, and then provide the second enable control signal E_CS2 to the second auxiliary current generation circuit 222_2. In this manner, the comparison circuit 221 may generate an nth enable control signal E_CSn by comparing the first voltage V1 to a voltage in which an nth offset voltage VOSn is added to the second voltage V2, and then provide the nth enable control signal E_CSn to the nth auxiliary current generation circuit 222_*n*.

To sequentially enable the first to nth auxiliary current generation circuits 222_1 to 222_*n* in response to the load current LC (see FIG. 3) which is increasing, magnitudes of the first to nth offset voltages VOS1 to VOSn may differ from each other. In example embodiments, a magnitude difference between adjacent offset voltages in the first to nth offset voltages VOS1 to VOSn may be identical. In some example embodiments, a magnitude difference between adjacent offset voltages in the first to nth offset voltages VOS1 to VOSn may vary.

The second LDO regulator 220 may output, to the output node N1 (see FIG. 3), the second load current I2 including an auxiliary current generated by at least one enabled auxiliary current generation circuit.

Further referring to FIG. 8B, the second operating region OPR2 of the system load may be subdivided into first to nth sub-operating regions OPR2_1 to OPR2_*n*. Second to nth reference currents I_REF2_1 to IREF2_*n* may indicate reference currents for discriminating the first to nth sub-operating regions OPR2_1 to OPR2_*n*.

In example embodiments, in a period between a first time point t13 and a second time point t23, in which the system load operates in the first sub-operating region OPR2_1, the first auxiliary current generation circuit 222_1 may be enabled. In a period between the second time point t23 and a third time point t33, in which the system load operates in the second sub-operating region OPR2_2, the second auxiliary current generation circuit 222_2 may be additionally enabled. In this manner, in a period between a fourth time point t43 and a fifth time point t53, in which the system load operates in the nth sub-operating region OPR2_*n*, the nth auxiliary current generation circuit 222_*n* may be additionally enabled so that all of the first to nth auxiliary current generation circuits 222_1 to 222_*n* are enabled. Thereafter, as the load current LC (see FIG. 3) decreases, the first to nth auxiliary current generation circuits 222_1 to 222_*n* may be sequentially disabled in a reverse order.

Further referring to FIG. 8C, the supply voltage may maintain a magnitude of the target power source voltage T_VDD when the system load operates in the first operating region OPR1, and start to drop when the system load operates in the second operating region OPR2. When the supply voltage enters a first range R1, the first auxiliary current generation circuit 222_1 may be enabled to primarily reduce or prevent the supply voltage from dropping. When the supply voltage continuously drops and enters a second range R2, the second auxiliary current generation circuit 222_2 may be additionally enabled to secondarily reduce or prevent the supply voltage from dropping. Thereafter, when the supply voltage continuously drops and enters an nth range Rn, the nth auxiliary current generation circuit 222_*n* may be additionally enabled to reduce or prevent the nth drop of the supply voltage.

The second LDO regulator 220 according to example embodiments of the inventive concepts may selectively enable the first to nth auxiliary current generation circuits 222_1 to 222_*n* according to circumstances so that efficient power consumption of the second LDO regulator 220 is possible.

Figure 9:
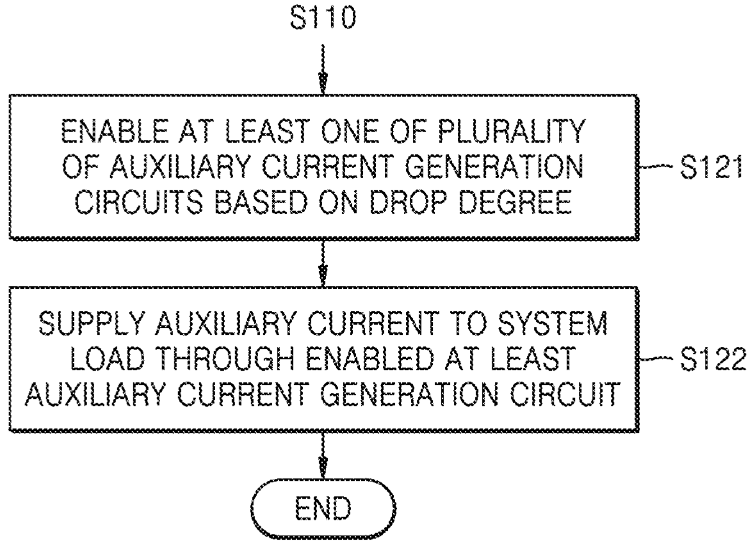
FIG. 9 is a flowchart of an example operating method of the integrated circuit in operation S120 of FIG. 2.

FIG. 9 is a flowchart of a particular operating method of the integrated circuit in operation S120 of FIG. 2.

Referring to FIG. 9, after operation S110 (FIG. 2), in operation S121, the integrated circuit may enable at least one of a plurality of auxiliary current generation circuits based on a drop degree of a supply voltage. For example, the number of auxiliary current generation circuits enabled by the integrated circuit may increase as a drop degree of the supply voltage from a target power source voltage increases. In operation S122, the integrated circuit may supply an auxiliary current to the system load through the enabled at least one auxiliary current generation circuit.

Figure 10A:
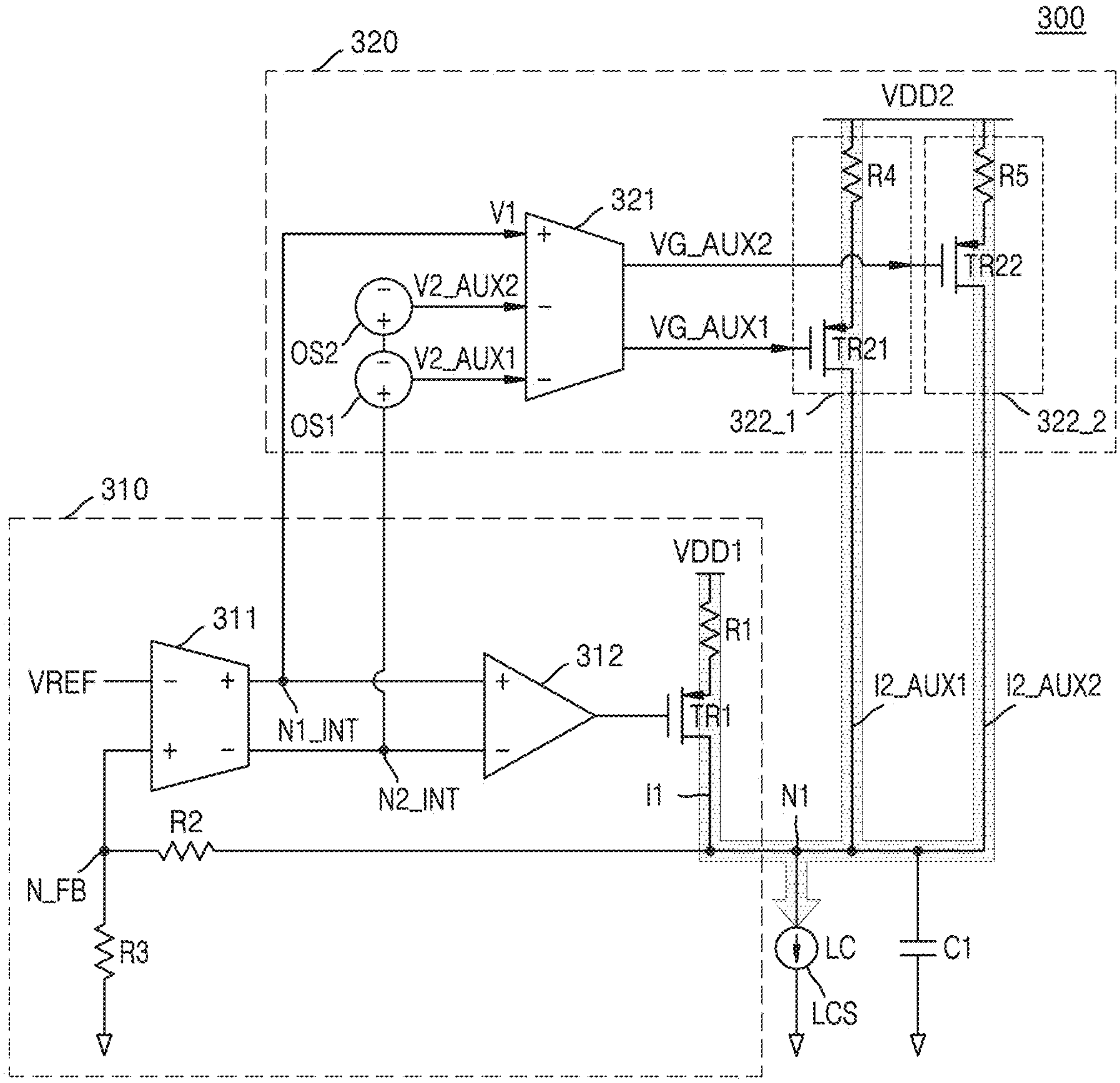
FIG. 10A is a circuit diagram of a power supply circuit according to example embodiments of the inventive concepts.
Figure 10B:
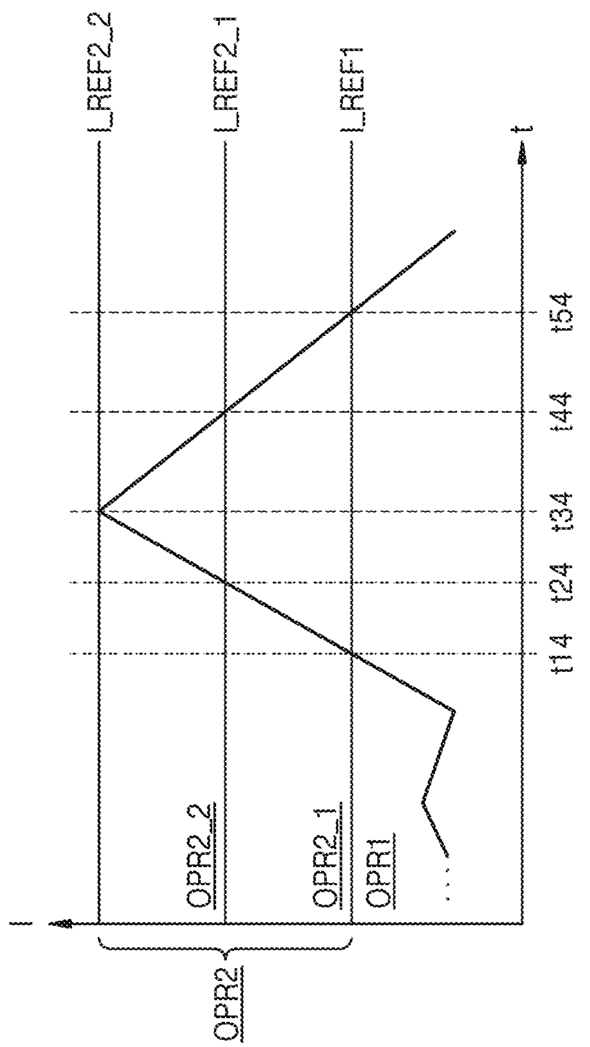
FIG. 10B is a graph for describing an operation of a second LDO regulator of FIG. 10A according to an operating region of a system load.

FIG. 10A is a circuit diagram of a power supply circuit 300 according to example embodiments of the inventive concepts, and FIG. 10B is a graph for describing an operation of a second LDO regulator 320 of FIG. 10A according to an operating region of a system load. The power supply circuit 300 shown in FIG. 10A is merely an example for describing the technical ideas of the inventive concepts, and thus, the inventive concepts are not limited thereto, and it will be sufficiently understood that implementation examples of the power supply circuit 300 may be various ones. In FIG. 10A, a description made with reference to FIG. 3 or 4C is not repeated.

Referring to FIG. 10A, the second LDO regulator 320 may include a comparison circuit 321, a first auxiliary current generation circuit 322_1, a second auxiliary current generation circuit 322_2, a first offset voltage source OS1, and/or a second offset voltage source OS2. Although FIG. 10A shows the second LDO regulator 320 including two auxiliary current generation circuits, e.g., the first and second auxiliary current generation circuits 322_1 and 322_2, the second LDO regulator 320 may include a greater number of auxiliary current generation circuits like the second LDO regulator 220 of FIG. 8A.

In example embodiments, the first auxiliary current generation circuit 322_1 may include the fourth resistor R4 and/or a second transistor TR21. One end of the fourth resistor R4 may be connected to a terminal through which the second power source voltage VDD2 is received, and the other end thereof may be connected to a source terminal of the second transistor TR21. A drain terminal of the second transistor TR21 may be connected to the output node N1, and a gate terminal thereof may receive a second gate voltage VG_AUX1 from the comparison circuit 321. The second gate voltage VG_AUX1 may be referred to as an enable control signal for the first auxiliary current generation circuit 322_1.

In example embodiments, the second auxiliary current generation circuit 322_2 may include a fifth resistor R5 and/or a third transistor TR22. One end of the fifth resistor R5 may be connected to the terminal through which the second power source voltage VDD2 is received, and the other end thereof may be connected to a source terminal of the third transistor TR22. A drain terminal of the third transistor TR22 may be connected to the output node N1, and a gate terminal thereof may receive a third gate voltage VG_AUX2 from the comparison circuit 321. The third gate voltage VG_AUX2 may be referred to as an enable control signal for the second auxiliary current generation circuit 322_2.

In example embodiments, the current driving capabilities of the second transistor TR21 and the third transistor TR22 may be the same as or different from each other. For example, a ratio of a length to a width of the second transistor TR21 may be the same as or different from a ratio of a length to a width of the third transistor TR22. For example, it may be implemented that the current driving capability of the second transistor TR21 is better than the current driving capability of the third transistor TR22 when an enable frequency of the first auxiliary current generation circuit 322_1 is greater than an enable frequency of the second auxiliary current generation circuit 322_2. However, this is only an example embodiment, and thus, the inventive concepts are not limited thereto, and transistors in auxiliary current generation circuits may be variously implemented.

In example embodiments, the comparison circuit 321 may receive the first voltage V1 of the first internal node N1_INT, a second voltage V2_AUX1 in which an offset voltage of the first offset voltage source OS1 is added to a voltage of the second internal node N2_INT, and a third voltage V2_AUX2 in which an offset voltage of the second offset voltage source OS2 is added to the second voltage V2_AUX1.

In example embodiments, the comparison circuit 321 may compare the first voltage V1 to the second voltage V2_AUX1, generate the second gate voltage VG_AUX1 based on a comparison result, and then provide the second gate voltage VG_AUX1 to the gate terminal of the second transistor TR21. The comparison circuit 321 may compare the first voltage V1 to the third voltage V2_AUX2, generate the third gate voltage VG_AUX2 based on a comparison result, and then provide the third gate voltage VG_AUX2 to the gate terminal of the third transistor TR22.

For example, when the first voltage V1 is greater than the second voltage V2_AUX1, the comparison circuit 321 may enable the first auxiliary current generation circuit 322_1, and the first auxiliary current generation circuit 322_1, which is enabled, may generate a first auxiliary current I2_AUX1 from the second power source voltage VDD2 and supply the first auxiliary current I2_AUX1 to the output node N1. When the first voltage V1 is greater than the third voltage V2_AUX2, the comparison circuit 321 may enable the second auxiliary current generation circuit 322_2, and the second auxiliary current generation circuit 322_2, which is enabled, may generate a second auxiliary current I2_AUX2 from the second power source voltage VDD2 and supply the second auxiliary current I2_AUX2 to the output node N1.

Further referring to FIG. 10B, the second operating region OPR2 of the system load may be subdivided into the first and second sub-operating regions OPR2_1 and OPR2_2. Second and third reference currents IREF2_1 and IREF2_2 may indicate reference currents for discriminating the first and second sub-operating regions OPR2_1 and OPR2_2.

In example embodiments, in a period between a first time point t14 and a second time point t24, in which the system load operates in the first sub-operating region OPR2_1, the first auxiliary current generation circuit 322_1 may be enabled. In a period between the second time point t24 and a third time point t34, in which the system load operates in the second sub-operating region OPR2_2, the second auxiliary current generation circuit 322_2 may be additionally enabled. Thereafter, in a period between a fourth time point t44 and a fifth time point t54, in which the system load operates in the first sub-operating region OPR2_1 again, the second auxiliary current generation circuit 322_2 may be disabled. After the fifth time point t54 where the system load operates in the first operating region OPR1 again, the first auxiliary current generation circuit 322_1 may be disabled.

Figure 11:
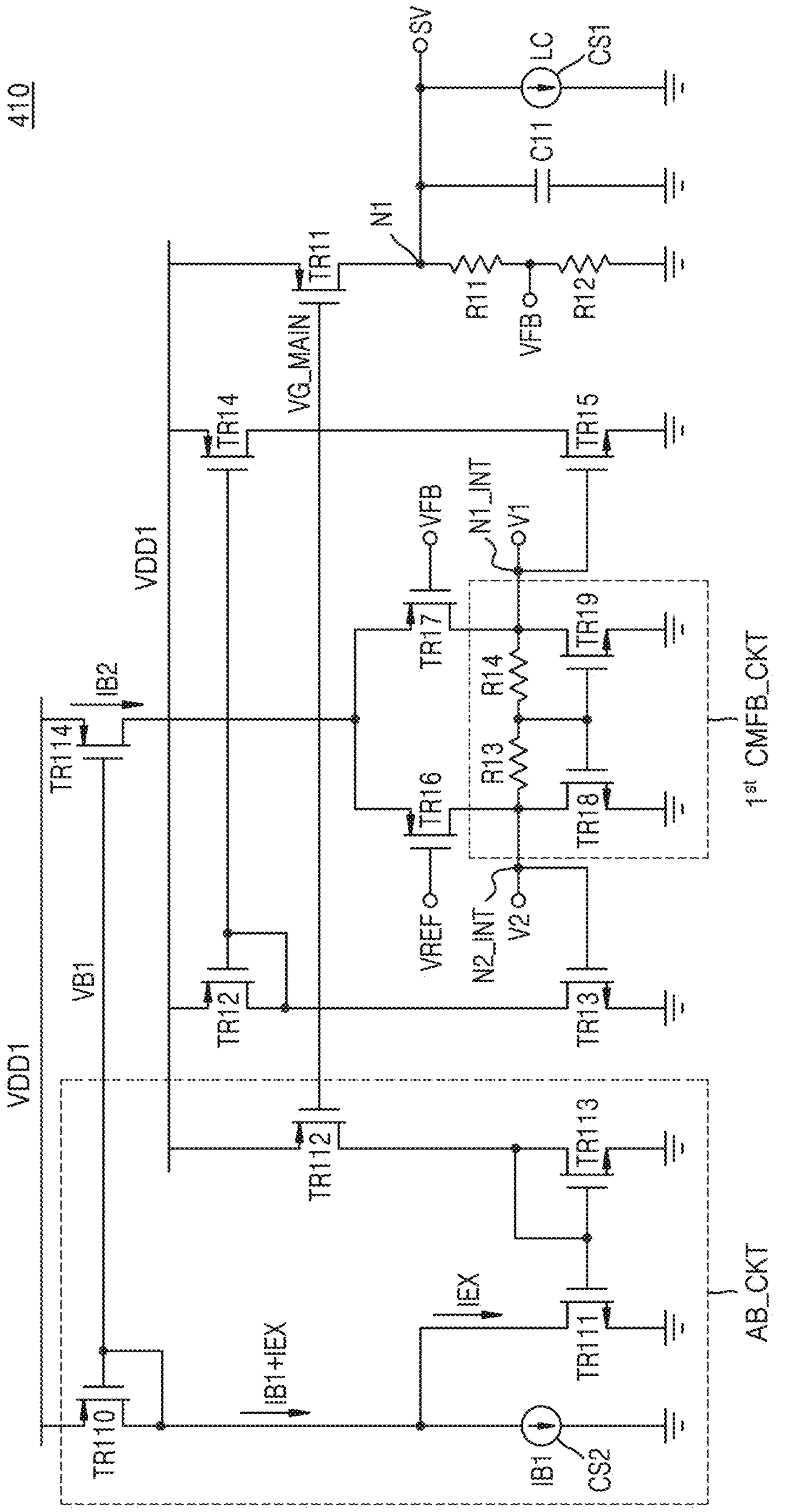
FIG. 11 is a circuit diagram of a first LDO regulator according to example embodiments of the inventive concepts.

FIG. 11 is a circuit diagram of a first LDO regulator 410 according to example embodiments of the inventive concepts. Because the first LDO regulator 410 shown in FIG. 11 is merely an example embodiment, the inventive concepts are not limited thereto, and various example embodiments in which the aforementioned operations of a first LDO regulator are performed may be implemented.

Referring to FIG. 11, the first LDO regulator 410 may include first to fourteenth transistors TR11 to TR114, first to fourth resistors R11 to R14, a capacitor C11, and/or first and second current sources CS1 and CS2. As described above, the first current source CS1 is a load current source and may output the load current LC drawn by a system load (not shown) connected to the first LDO regulator 410. The first, second, fourth, sixth, seventh, tenth, twelfth, and/or fourteenth transistors TR11, TR12, TR14, TR16, TR17, TR110, TR112, and/or TR114 may be p-channel transistors, and the other transistors, e.g., the third, fifth, eighth, ninth, eleventh, and/or thirteenth transistors TR13, TR15, TR18, TR19, TR111, and/or TR113, may be n-channel transistors A source terminal of the first transistor TR11 may be connected to a terminal through which the first power source voltage VDD1 is received, a drain terminal thereof may be connected to the output node N1, and a gate terminal thereof may be connected to a gate terminal of the twelfth transistor TR112 to receive the first gate voltage VG_MAIN. The first transistor TR11 may generate a first load current I_MAIN from the first power source voltage VDD1 in response to the first gate voltage VG_MAIN. A voltage of the output node N1 is the supply voltage SV and may be supplied to the system load (not shown). The output node N1 may be the output node N1 described with reference to FIG. 3 and/or the like.

One end of the first resistor R11 may be connected to the output node N1, and the other end thereof may be connected to one end of the second resistor R12. The other end of the second resistor R12 may be connected to the ground. The first and second resistors R11 and R12 may generate the feedback voltage VFB from the supply voltage SV. One end of the capacitor C11 may be connected to the output node N1, and the other end thereof may be connected to the ground.

The second and fourth transistors T12 and T14, the tenth and fourteenth transistors T10 and T114, and the eleventh and thirteenth transistors T111 and T113 may form respective current mirrors. A magnitude of a current to be radiated may be adjusted according to a ratio of magnitudes of two transistors forming a current mirror. For example, a size of a transistor may be defined by a ratio of a length to a width of the transistor.

A source terminal of the fourteenth transistor TR114 may be connected to the terminal through which the first power source voltage VDD1 is received, a gate terminal thereof may receive a bias voltage VB1, and a drain terminal thereof may be connected to source terminals of the sixth and seventh transistors TR16 and TR17. The fourteenth transistor TR114 may generate a second bias current IB2 from the first power source voltage VDD1 in response to the bias voltage VB1 and output the second bias current IB2 to the source terminals of the sixth and seventh transistors TR16 and TR17.

A gate terminal of the sixth transistor TR16 may receive the reference voltage VREF, and a drain terminal thereof may be connected to the second internal node N2_INT. The second internal node N2_INT may be the second internal node N2_INT described with reference to FIG. 3 and/or the like. A gate terminal of the seventh transistor TR17 may receive the feedback voltage VFB, and a drain terminal thereof may be connected to the first internal node N1_INT. The first internal node N1_INT may be the first internal node N1_INT described with reference to FIG. 3 and/or the like. The first and second internal nodes N1_INT and N2_INT may be connected to a second LDO regulator 420 (see FIG. 12) to be described with reference to FIG. 12.

One end of the third resistor R13 may be connected to the second internal node N2_INT, and the other end thereof may be connected to one end of the fourth resistor R14 and gate terminals of the eighth and ninth transistors TR18 and TR19. The other end of the fourth resistor R14 may be connected to the first internal node N1_INT. For example, a resistance value of the third resistor R13 may be the same as a resistance value of the fourth resistor R14, and the third and fourth resistors R13 and R14 may increase a resistance value of the first LDO regulator 410, thereby improving a gain of the first LDO regulator 410. A drain terminal of the eighth transistor TR18 may be connected to the second internal node N2_INT, and a source terminal thereof may be connected to the ground. A drain terminal of the ninth transistor TR19 may be connected to the first internal node N1_INT, and a source terminal thereof may be connected to the ground.

For example, when a magnitude of the reference voltage VREF is the same as a magnitude of the feedback voltage VFB, a magnitude of the first voltage V1 may be the same as a magnitude of the second voltage V2. Thereafter, as the feedback voltage VFB is less than the reference voltage VREF, the first voltage V1 may be greater than the second voltage V2. The second LDO regulator 420 to be described below may generate a second load current based on a difference between the first voltage V1 and the second voltage V2.

The third resistor R13, the fourth resistor R14, the eighth transistor TR18, and the ninth transistor TR19 may be included in a first common mode feedback (CMFB) circuit $1^{st}$ CMFB_CKT. That is, the eighth transistor TR18 and the ninth transistor TR19 may have a diode-connected n-type metal oxide semiconductor (NMOS) structure.

As the load current LC increases, the first load current I_MAIN may increase, and as a result, the first gate voltage VG_MAIN may decrease, thereby causing a resistance value of the first transistor TR11 to decrease. The decrease in the resistance value of the first transistor TR11 may cause a decrease in an amplification gain of the first LDO regulator 410, and thus, to reduce or prevent this, an adaptive biasing circuit AB_CKT may be applied.

The tenth transistor TR110, the eleventh transistor TR111, the twelfth transistor TR112, the thirteenth transistor TR113, and the second current source CS2 may be included in the adaptive biasing circuit AB_CKT. In example embodiments, the twelfth transistor TR112 may share the first gate voltage VG_MAIN with the first transistor TR11. As the first gate voltage VG_MAIN provided to the twelfth transistor TR112 decreases, an additional current IEX by the current mirror of the eleventh and thirteenth transistors TR111 and TR113 may increase. The tenth transistor TR110 may output, through a drain terminal thereof, a summed current of the additional current IEX and a first bias current IB1. Because the fourteenth transistor TR114 forms a current mirror with the tenth transistor TR110 by sharing a first bias voltage VB1, the fourteenth transistor TR114 may output, through the drain terminal thereof, a second bias current IB2 that is proportional to the summed current IB1+IEX. Because the additional current IEX increases in response to the first gate voltage VG_MAIN which decreases, the second bias current IB2 may increase as a result, and the amplification gain of the first LDO regulator 410 may be maintained by the increased second bias current IB2.

In example embodiments, the adaptive biasing circuit AB_CKT may stabilize the amplification gain of the first LDO regulator 410 by adjusting the second bias current IB2.

In some example embodiments, the adaptive biasing circuit AB_CKT may be omitted from the first LDO regulator 410.

Figure 12:
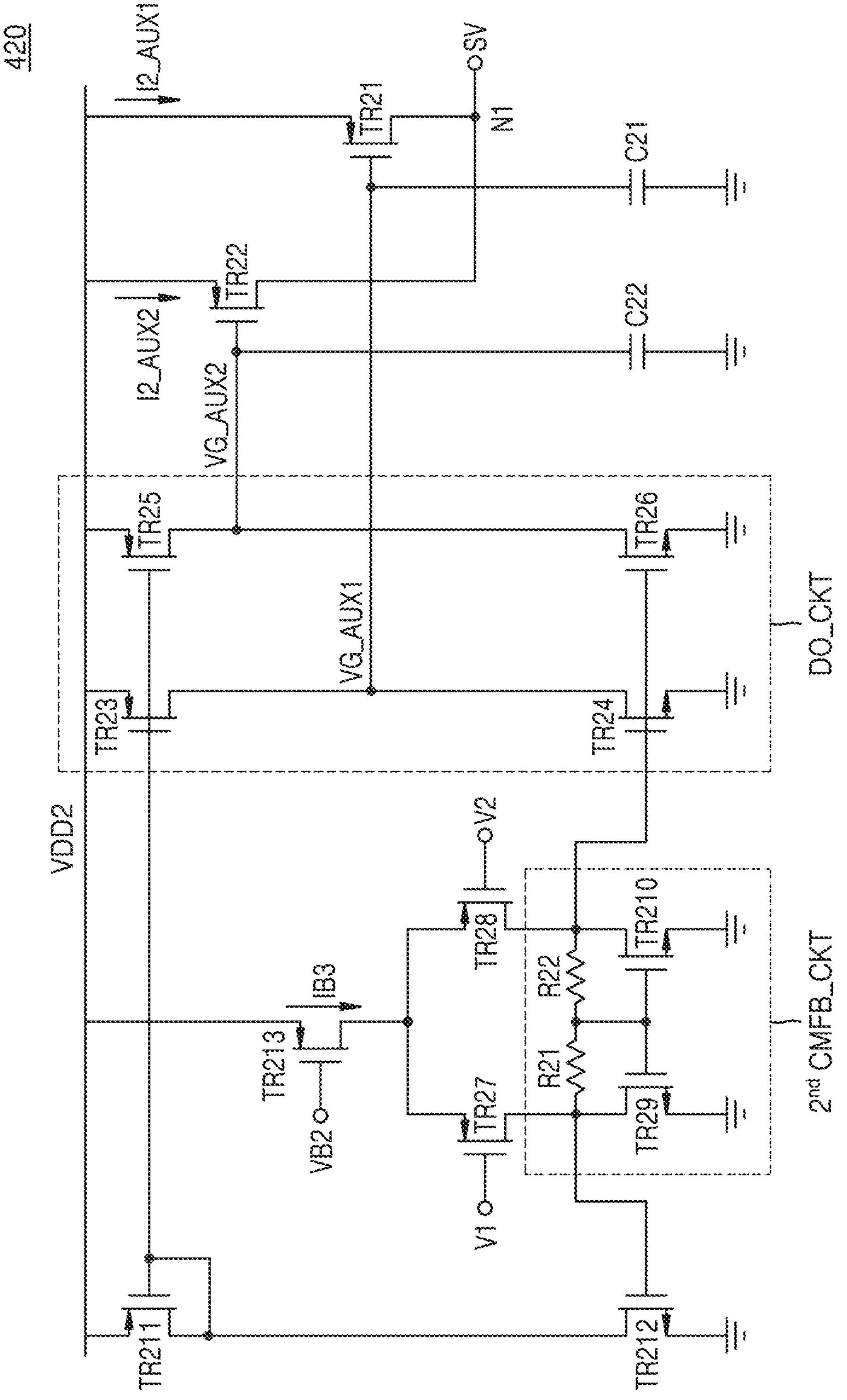
FIG. 12 is a circuit diagram of a second LDO regulator according to example embodiments of the inventive concepts.

FIG. 12 is a circuit diagram of the second LDO regulator 420 according to example embodiments of the inventive concepts. Because the second LDO regulator 420 shown in FIG. 12 is merely an example embodiment, the inventive concepts are not limited thereto, and various example embodiments in which the aforementioned operations of a second LDO regulator are performed may be implemented.

Referring to FIG. 12, the second LDO regulator 420 may include first to thirteenth transistors TR21 to TR213, first and second resistors R21 and R22, and/or first and second capacitors C21 and C22. The first, second, third, fifth, seventh, eighth, eleventh, and/or thirteenth transistors TR21, TR22, TR23, TR25, TR211, TR213 may be p-channel transistors, and the other transistors, e.g., the fourth, sixth, ninth, tenth, and/or twelfth transistors TR24, TR26, TR29, TR210, TR212, may be n-channel transistors.

A source terminal of the first transistor TR21 may be connected to a terminal through which the second power source voltage VDD2 is received, a gate terminal thereof may receive the second gate voltage VG_AUX1, and a drain terminal thereof may be connected to the output node N1. The first transistor TR21 may generate the first auxiliary current I2_AUX1 in response to the second gate voltage VG_AUX1. The first transistor TR21 may be included in the first auxiliary current generation circuit 322_1 described above.

A source terminal of the second transistor TR22 may be connected to the terminal through which the second power source voltage VDD2 is received, a gate terminal thereof may receive the third gate voltage VG_AUX2, and a drain terminal thereof may be connected to the output node N1. The second transistor TR22 may generate the second auxiliary current I2_AUX2 in response to the third gate voltage VG_AUX2. The second transistor TR22 may be included in the second auxiliary current generation circuit 322_2 described above. One end of the first capacitor C21 and one end of the second capacitor C22 may be connected to the gate terminals of the first and second transistors TR21 and TR22, respectively.

Each of the third and fifth transistors TR23 and TR25 may form a current mirror with the eleventh transistor TR211. Each of source terminals of the third and fifth transistors TR23 and TR25 may be connected to the terminal through which the second power source voltage VDD2 is received The third and fourth transistors TR23 and TR24 may share a node which outputs the second gate voltage VG_AUX1, and may be implemented to generate the second gate voltage VG_AUX1 in which the first offset voltage of the first offset voltage source OS1 of FIG. 10A is considered. The fifth and sixth transistors TR25 and TR26 may share a node which outputs the third gate voltage VG_AUX2, and may be implemented to generate the third gate voltage VG_AUX2 in which the first offset voltage of the first offset voltage source OS1 and the second offset voltage of the second offset voltage source OS2 of FIG. 10A are considered. For example, a size ratio of the eleventh transistor TR211 to the twelfth transistor TR212 may be different from each of a size ratio of the third transistor TR23 to the fourth transistor TR24 and a size ratio of the fifth transistor TR25 to the sixth transistor TR26. For example, when the size ratio of the eleventh transistor TR211 to the twelfth transistor TR212 is 2:1, the size ratio of the third transistor TR23 to the fourth transistor TR24 may be 4:1, and the size ratio of the fifth transistor TR25 to the sixth transistor TR26 may be 8:1. By doing this, a level transition timing of the second gate voltage VG_AUX1 and a level transition timing of the third gate voltage VG_AUX2 may be differently controlled, and first and second auxiliary current generation circuits may be sequentially enabled in response to the second gate voltage VG_AUX1 and the third gate voltage VG_AUX2, respectively.

In some example embodiments, a separate offset voltage source may be omitted. In some example embodiments, the size ratio of the third transistor TR23 to the fourth transistor TR24 and the size ratio of the fifth transistor TR25 to the sixth transistor TR26 may be variable according to an offset voltage which an operation requires.

The third to sixth transistors TR23 to TR26 may be included in a dual output circuit DO_CKT, the third and fourth transistors TR23 and TR24 may be defined as a first output circuit, and the fifth and sixth transistors TR25 and TR26 may be defined as a second output circuit. In addition, the third and fifth transistors TR23 and TR25 may be referred to as pull-up transistors, and the fourth and sixth transistors TR24 and TR26 may be referred to as pull-down transistors.

A source terminal of the thirteenth transistor TR213 may be connected to the terminal through which the second power source voltage VDD2 is received, a gate terminal thereof may receive a second bias voltage VB2, and a drain terminal thereof may be connected to source terminals of the seventh and eighth transistors TR27 and TR28. The thirteenth transistor TR213 may output a third bias current IB3 in response to the second bias voltage VB2.

A gate terminal of the seventh transistor TR27 may receive the first voltage V1, and a gate terminal of the eighth transistor TR28 may receive the second voltage V2. The first voltage V1 may correspond to the first voltage V1 of FIG. 11, and the second voltage V2 may correspond to the second voltage V2 of FIG. 11. A drain terminal of the seventh transistor TR27 may be connected to each of one end of the first resistor R21, a drain terminal of the ninth transistor TR29, and a gate terminal of the twelfth transistor TR212. A drain terminal of the eighth transistor TR28 may be connected to each of one end of the second resistor R22, a drain terminal of the tenth transistor TR210, a gate terminal of the fourth transistor TR24, and a gate terminal of the sixth transistor TR26. The other end of the first resistor R21 may be connected to each of the other end of the second resistor R22 and a gate terminal of the ninth transistor TR29 and a gate terminal of the tenth transistor TR210. For example, a resistance value of the first resistor R21 may be the same as a resistance value of the second resistor R22, and the first and second resistors R21 and R22 may increase a resistance value of the second LDO regulator 420, thereby improving a gain of the second LDO regulator 420. In example embodiments, a ratio of a length to a width of the seventh transistor TR27 may be different from a ratio of a length to a width of the eighth transistor TR28.

The first resistor R21, the second resistor R22, the ninth transistor TR29, and the tenth transistor TR210 may be included in a second CMFB circuit $2^{nd}$ CMFB_CKT. That is, the ninth transistor TR29 and the tenth transistor TR210 may have a diode-connected NMOS structure.

The second LDO regulator 420 may generate at least one of the first and second auxiliary currents I2_AUX1 and I2_AUX2 based on a difference between the first and second voltages V1 and V2. A particular operation of the second LDO regulator 420 has been described above, and thus is omitted herein.

Figure 13:
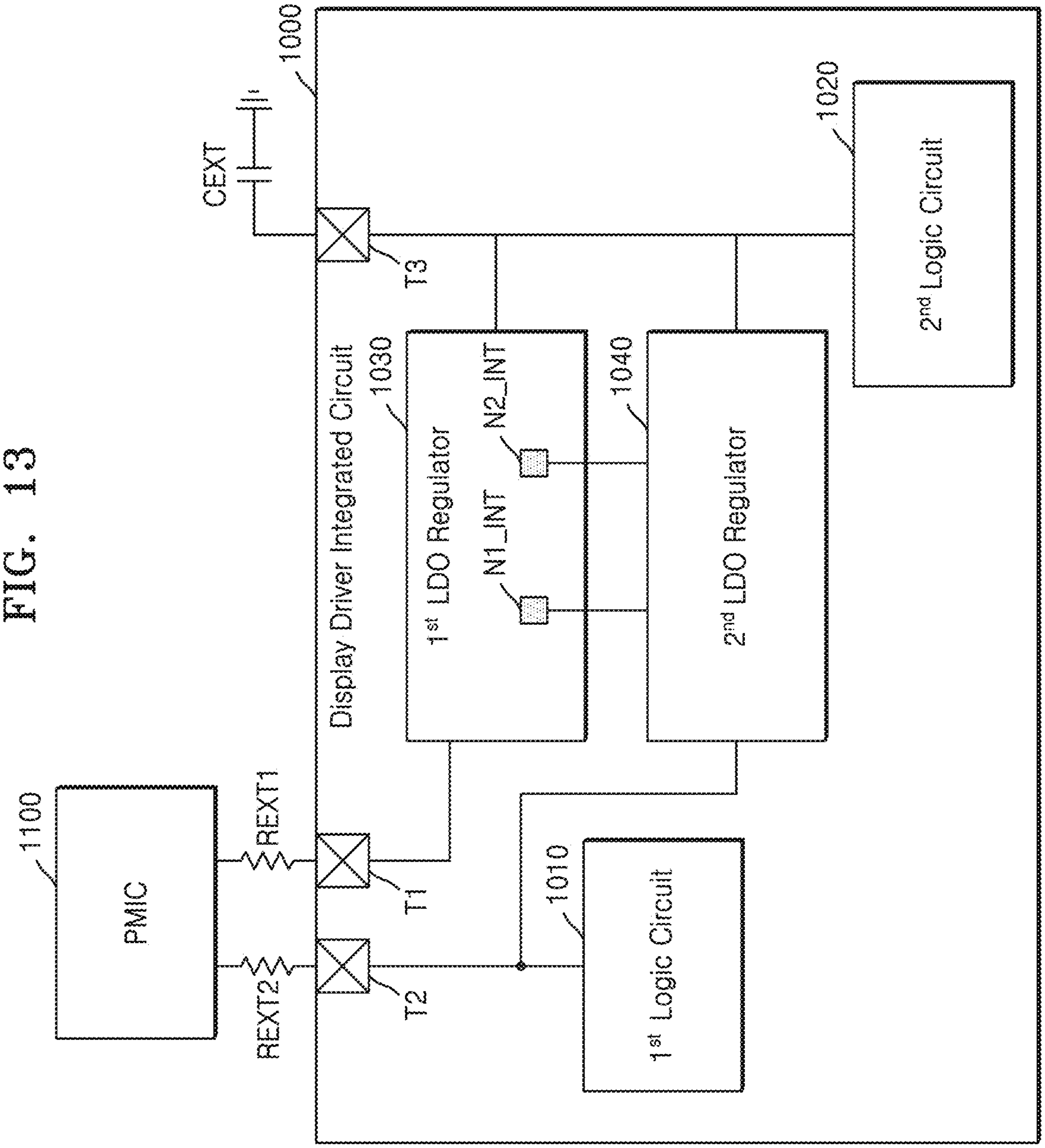
FIG. 13 is a block diagram of a display driver integrated circuit according to example embodiments of the inventive concepts.

FIG. 13 is a block diagram of a display driver integrated circuit (DDI) 1000 according to example embodiments of the inventive concepts.

Referring to FIG. 13, the DDI 1000 may include a first terminal T1, a second terminal T2, a third terminal T3, a first logic circuit 1010, a first LDO regulator 1030, a second LDO regulator 1040, and/or a second logic circuit 1020. The first terminal T1 may be connected to a power management integrated circuit (PMIC) 1100 through a first external resistor REXT1 to receive a first power source voltage. The second terminal T2 may be connected to the PMIC 1100 through a second external resistor REXT2 to receive a second power source voltage. The third terminal T3 may be connected to an external capacitor CEXT to plan a stable operation of the first and second LDO regulators 1030 and 1040.

The first power source voltage received through the first terminal T1 may be less than or equal to the second power source voltage received through the second terminal T2. The DDI 1000 may receive different power source voltages from the PMIC 1100 through independent terminals, e.g., the first and second terminals T1 and T2. The first logic circuit 1010 may perform a certain operation by directly receiving the first power source voltage through the first terminal T1. The second logic circuit 1020 may perform a certain operation by receiving a supply voltage from the first and second LDO regulators 1030 and 1040. The first logic circuit 1010 may perform a different operation from that of the second logic circuit 1020.

The first LDO regulator 1030 may be connected to the first terminal T1 to receive the first power source voltage, generate a first load current from the first power source voltage, and supply the first load current to the second logic circuit 1020. As power consumption of the second logic circuit 1020 increases, a load current drawn by the second logic circuit 1020 increases, and thus, the first load current may increase. When the first load current is saturated due to limitation of the first LDO regulator 1030, the second LDO regulator 1040 according to example embodiments of the inventive concepts may generate a second load current and additionally supply the second load current to the second logic circuit 1020.

In example embodiments, the second LDO regulator 1040 may be connected to the first and second internal nodes N1_INT and N2_INT of the first LDO regulator 1030, and when a difference between voltages of the first and second internal nodes N1_INT and N2_INT is greater than or equal to a reference value, the second LDO regulator 1040 may generate the second load current from the second power source voltage received through the second terminal T2 and output the second load current to the second logic circuit 1020. The various example embodiments described with reference to FIG. 1 and/or the like may be applied to the second LDO regulator 1040, and a particular description thereof has been made above, and thus is omitted herein.

The second logic circuit 1020 may operate by receiving the supply voltage generated from at least one of the first and second power source voltages received through the first and second terminals T1 and T2, and as a result, a power consumption range of the second logic circuit 1020 may be widened, thereby performing various operations.

Figure 14:
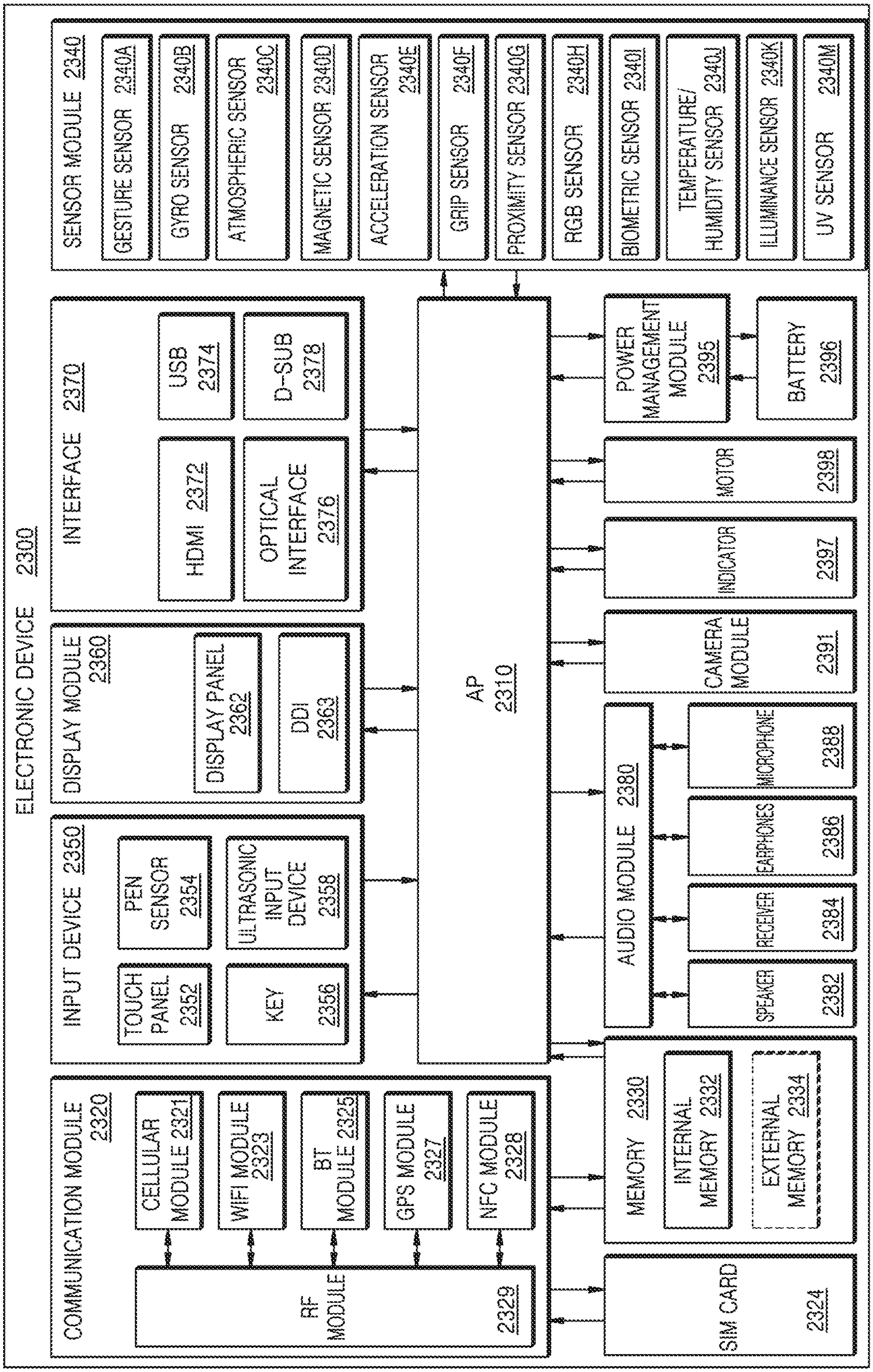
FIG. 14 is a block diagram of an electronic device according to example embodiments of the inventive concepts.

FIG. 14 is a block diagram of an electronic device 2300 according to example embodiments of the inventive concepts.

The electronic device 2300 may include, for example, all or a portion of the integrated circuit 10 shown in FIG. 1. Referring to FIG. 14, the electronic device 2300 may include at least one application processor (AP) 2310, a communication module 2320, a subscriber identification module (SIM) card 2324, a memory 2330, a sensor module 2340, an input device 2350, a display module 2360, an interface 2370, an audio module 2380, a camera module 2391, a power management module 2395, a battery 2396, an indicator 2397, and/or a motor 2398.

The at least one AP 2310 may control a plurality of hardware or software components connected to the at least one AP 2310, by running an operating system or an application program, and process and compute various kinds of data including multimedia data. The at least one AP 2310 may be implemented by, for example, a system on chip (SoC). According to example embodiments, the at least one AP 2310 may further include a graphics processing unit (GPU) (not shown).

The communication module 2320 may perform data transmission and reception in communication between the electronic device 2300 and other electronic devices connected thereto through a network. According to example embodiments, the communication module 2320 may include a cellular module 2321, a Wifi module 2323, a Bluetooth (BT) module 2325, a global positioning system (GPS) module 2327, a near field communication (NFC) module 2328, and a radio frequency (RF) module 2329.

The cellular module 2321 may provide a voice call, a video call, a text service, an Internet service, and/or the like through a communication network (e.g., a long term evolution (LTE) network, an LTE-advanced (LTE-A) network, a code division multiple access (CDMA) network, a wideband CDMA (WCDMA) network, a universal mobile telecommunication system (UMTS) network, a WiBro network, a global system for mobile communication (GSM) network, and/or the like). In addition, the cellular module 2321 may identify and authenticate an electronic device in a communication network by using, for example, a SIM module (e.g., the SIM card 2324). According to example embodiments, the cellular module 2321 may perform at least some of functions which the at least one AP 2310 provides. For example, the cellular module 2321 may perform at least a portion of a multimedia control function.

The cellular module 2321 may include a communication processor (CP). In addition, the cellular module 2321 may be implemented by, for example, an SoC. Although FIG. 14 shows that components such as the cellular module 2321 (e.g., the CP), the memory 2330, and the power management module 2395 are separate components from the at least one AP 2310, according to example embodiments, the at least one AP 2310 may be implemented to include at least some (e.g., the cellular module 2321) of the components described above.

The at least one AP 2310 or the cellular module 2321 (e.g., the CP) may load, on a volatile memory, a command or data received from at least one of a nonvolatile memory and the other components connected thereto and process the loaded command or data. In addition, the at least one AP 2310 or the cellular module 2321 may store, in the nonvolatile memory, data received from or generated by at least one of the other components.

Each of the Wifi module 2323, the BT module 2325, the GPS module 2327, and/or the NFC module 2328 may include, for example, a processor configured to process data transmitted and received through a corresponding module. Although FIG. 14 shows that the cellular module 2321, the Wifi module 2323, the BT module 2325, the GPS module 2327, and the NFC module 2328 are individual blocks, according to example embodiments, at least some (e.g., two or more) of the cellular module 2321, the Wifi module 2323, the BT module 2325, the GPS module 2327, and/or the NFC module 2328 may be included in an integrated chip (IC) or an IC package. For example, at least some (e.g., the CP corresponding to the cellular module 2321 and a Wifi processor corresponding to the Wifi module 2323) of processors respectively corresponding to the cellular module 2321, the Wifi module 2323, the BT module 2325, the GPS module 2327, and/or the NFC module 2328 may be implemented by one SoC.

The RF module 2329 may transmit and receive data, e.g., an RF signal. The RF module 2329 may include, for example, a transceiver, a power amplification module (PAM), a frequency filter, a low noise amplifier (LNA), and/or the like, although not shown. In addition, the RF module 2329 may further include a component, e.g., a conductor or a conductive wire, configured to transmit and receive electromagnetic waves in a free space in wireless communication. Although FIG. 14 shows that the cellular module 2321, the Wifi module 2323, the BT module 2325, the GPS module 2327, and/or the NFC module 2328 share the RF module 2329, according to example embodiments, at least one of the cellular module 2321, the Wifi module 2323, the BT module 2325, the GPS module 2327, and/or the NFC module 2328 may transmit and receive an RF signal through a separate RF module.

The SIM card 2324 may include an SIM and may be inserted into a slot formed at a particular position of the electronic device 2300. The SIM card 2324 may contain unique identification information (e.g., an integrated circuit card identifier (ICCID)) or subscriber information (e.g., international mobile subscriber identity (IMSI)).

The memory 2330 may include an internal memory 2332 and an external memory 2334. The internal memory 2332 may include at least one of, for example, volatile memories (e.g., dynamic random access memory (DRAM), static RAM (SRAM), synchronous dynamic RAM (SDRAM), and/or the like) and nonvolatile memories (e.g., one time programmable read-only memory (OTPROM), programmable ROM (PROM), erasable and programmable ROM (EPROM), electrically erasable and programmable ROM (EEPROM), mask ROM, flash ROM, a NAND flash memory, a NOR flash memory, and/or the like).

The internal memory 2332 may be a solid state drive (SSD). The external memory 2334 may further include a flash drive, e.g., a compact flash (CF) card, a secure digital (SD) card, a micro secure digital (Micro-SD) card, a mini secure digital (Mini-SD) card, an extreme digital (xD) card, a memory stick, and/or the like. The external memory 2334 may be functionally connected to the electronic device 2300 through various interfaces. According to example embodiments, the electronic device 2300 may further include a storage device (or a storage medium) such as a hard drive.

The sensor module 2340 may measure a physical amount or detect an operating state of the electronic device 2300 and convert the measured or detected information into an electrical signal. The sensor module 2340 may include at least one of, for example, a gesture sensor 2340A, a gyro sensor 2340B, an atmospheric sensor 2340C, a magnetic sensor 2340D, an acceleration sensor 2340E, a grip sensor 2340F, a proximity sensor 2340G, a color sensor (e.g., a red, green, and blue (RGB) sensor) 2340H, a biometric sensor 23401, a temperature/humidity sensor 2340J, an illuminance sensor 2340K, and an ultraviolet (UV) sensor 2340M. Additionally or alternatively, the sensor module 2340 may include, for example, an olfactory (e-nose) sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), a fingerprint sensor (not shown), and/or the like. The sensor module 2340 may further include a control circuit configured to control at least one sensor included in the sensor module 2340.

The input device 2350 may include a touch panel 2352, a (digital) pen sensor 2354, a key 2356, or an ultrasonic input device 2358. The touch panel 2352 may recognize a touch input in at least one of, for example, an electrostatic manner, a pressure sensitive manner, an IR manner, and an ultrasonic manner. In addition, the touch panel 2352 may further include a control circuit. In the electrostatic manner, a physical contact or a close access may be recognized. The touch panel 2352 may further include a tactile layer. In some example embodiments, the touch panel 2352 may provide a tactile reaction to a user.

The (digital) pen sensor 2354 may be implemented by using, for example, the same or a similar method as or to receiving a touch input of the user, or using a separate sheet for recognition. The key 2356 may include, for example, a physical button, an optical key, or a keypad. The ultrasonic input device 2358 is a device capable of confirming data by detecting a sound wave by a microphone (e.g., a microphone 2388) in the electronic device 2300 through an input tool configured to generate an ultrasonic signal and may perform wireless recognition. According to example embodiments, the electronic device 2300 may receive a user input from an external device (e.g., a computer or a server) connected thereto by using the communication module 2320.

The display module 2360 may include a display panel 2362 and a DDI 2363. The display panel 2362 may include, for example, a liquid crystal display (LCD), an active-matrix organic light-emitting diode (AM-OLED) display, and/or the like. The display panel 2362 may be implemented to be, for example, flexible, transparent, or wearable. The display panel 2362 may form one module with the touch panel 2352. The display panel 2362 may include a plurality of areas. Alternatively, a plurality of display panels 2362 may be included.

The display panel 2362 may be replaced with a hologram device or a projector. The hologram device may display a stereographic image in the air by using interference of light. The projector may display an image by projecting light on a screen. The screen may be located, for example, inside or outside the electronic device 2300.

The DDI 2363 may receive display data from the at least one AP 2310 and drive the display panel 2362 based on the received display data. The DDI 2363 according to example embodiments of the inventive concepts may include first and second LDO regulators (not shown) configured to cover a wide power consumption range of a system load, and the second LDO regulator may be connected to internal nodes of the first LDO regulator to generate a second load current for supplementing a first load current of the first LDO regulator. Example embodiments described with reference to FIG. 1 and/or the like may be applied to the DDI 2363, and a particular description thereof is omitted herein.

The interface 2370 may include, for example, a high-definition multimedia interface (HDMI) 2372, a universal serial bus (USB) interface 2374, an optical interface 2376, or a D-subminiature (D-sub) interface 2378. Additionally or alternatively, the interface 2370 may include, for example, a mobile high-definition link (MHL) interface, an SD card/multimedia card (MMC) interface, or an infrared data association (IrDA) standard interface.

The audio module 2380 may convert a sound into an electrical signal, and vice versa. The audio module 2380 may process sound information input or output through, for example, a speaker 2382, a receiver 2384, earphones 2386, the microphone 2388, and/or the like.

The camera module 2391 is a device capable of capturing a still image or a moving picture, and according to example embodiments, the camera module 2391 may include one or more image sensors (e.g., a front sensor and a rear sensor), a lens (not shown), an image signal processor (ISP) (not shown), and/or a flash (e.g., a light-emitting diode (LED) or xenon lamp) (not shown).

The power management module 2395 may manage power of the electronic device 2300. Although not shown, the power management module 2395 may include, for example, a PMIC, a charger IC, and/or a battery or fuel gauge. In some example embodiments, the power management module 2395 may include, instead of the DDI 2363, first and second LDO regulators to which the technical ideas of the inventive concepts is applied, and when a supply voltage is provided to the DDI 2363, the technical ideas of the inventive concepts may be applied to the power management module 2395.

The PMIC may be, for example, mounted in an integrated circuit or an SoC semiconductor. A charging scheme may be divided into a wired charging scheme and a wireless charging scheme. The charger IC may charge the battery 2396 and reduce or prevent inflow of an overvoltage or an overcurrent from a charger. According to example embodiments, the charger IC may include a charger IC based on at least one of the wired charging scheme and the wireless charging scheme. The wireless charging scheme may include, for example, a magnetic resonance scheme, a magnetic induction scheme, an electromagnetic wave scheme, and/or the like, and an additional circuit, e.g., a coil loop, a resonance circuit, a rectifier, and/or the like, for wireless charging may be added.

The battery gauge may measure, for example, a remaining capacity of the battery 2396 and a voltage, a current, or a temperature thereof during charging. The battery 2396 may store or generate electricity, and supply power to the electronic device 2300 by using the stored or generated electricity. The battery 2396 may include, for example, a rechargeable battery or a solar cell.

The indicator 2397 may indicate a particular state, e.g., a booting state, a messaging state, a charging state, and/or the like, of the electronic device 2300 or a portion (e.g., the at least one AP 2310) thereof. The motor 2398 may convert an electrical signal into mechanical vibration. Although not shown, the electronic device 2300 may include a processing device (e.g., a GPU) configured to support a mobile TV. The processing device configured to support a mobile TV may process media data according to, for example, a digital multimedia broadcasting (DMB) standard, a digital video broadcasting (DVB) standard, a media flow standard, and/or the like.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. An integrated circuit comprising:

a power supply circuit configured to generate a supply voltage from at least one of first and second power source voltages; and a system load configured to operate by receiving the supply voltage through an output node of the power supply circuit, wherein the power supply circuit comprises:

a first low drop-output (LDO) regulator configured to generate, from the first power source voltage, a first load current flowing to the system load through the output node; and a second LDO regulator configured to selectively generate a second load current flowing to the system load through the output node, from the second power source voltage based on a difference between voltages of internal nodes of the first LDO regulator.

2. The integrated circuit of claim 1, wherein the voltages of the internal nodes vary in response to a change in the supply voltage as a third load current drawn by the system load increases.

3. The integrated circuit of claim 1, wherein each of the internal nodes is configured to output a difference between a reference voltage applied to the first LDO regulator and a feedback voltage matched with the supply voltage.

4. The integrated circuit of claim 1, wherein the second LDO regulator is further configured to generate the second load current when the difference between the voltages of the internal nodes is greater than or equal to a reference value.

5. The integrated circuit of claim 1, wherein the second LDO regulator comprises a plurality of auxiliary current generation circuits, each configured to generate, from the second power source voltage, an auxiliary current included in the second load current.

6. The integrated circuit of claim 5, wherein the second LDO regulator is further configured to enable at least one of the plurality of auxiliary current generation circuits based on a magnitude of the difference between the voltages of the internal nodes.

7. The integrated circuit of claim 6, wherein the second LDO regulator is further configured to increase a number of auxiliary current generation circuits enabled as the difference between the voltages of the internal nodes increases.

8. The integrated circuit of claim 1, wherein the system load is further configured to receive the first load current from the first LDO regulator when operating in a first operating region, and receive the second load current from the second LDO regulator together with the first load current when operating in a second operating region.

9. An integrated circuit comprising:

a power supply circuit configured to generate a supply voltage from at least one of first and second power source voltages; and a system load configured to operate by receiving the supply voltage from the power supply circuit and draw a first load current from the power supply circuit, wherein the power supply circuit comprises:

a first low drop-output (LDO) regulator configured to generate, from the first power source voltage, a second load current flowing to the system load; and a second LDO regulator configured to generate a third load current flowing to the system load, from the second power source voltage in response to a saturated state of the second load current according to an increase in the first load current.

10. The integrated circuit of claim 9, wherein the second LDO regulator is further configured to start to generate the third load current after a certain interval from a time point where the second load current reaches the saturated state.

11. The integrated circuit of claim 9, wherein the second LDO regulator is connected to internal nodes of the first LDO regulator and is further configured to generate the third load current based on a difference between voltages of the internal nodes.

12. The integrated circuit of claim 11, wherein each of the internal nodes is configured to output a difference between a reference voltage applied to the first LDO regulator and a feedback voltage matched with the supply voltage.

13. The integrated circuit of claim 12, wherein magnitudes of the voltages of the internal nodes are the same as each other before the first load current is saturated.

14. The integrated circuit of claim 9, wherein the second LDO regulator comprises a plurality of auxiliary current generation circuits, each configured to generate an auxiliary current included in the third load current, by being sequentially enabled according to a magnitude of the first load current.

15. The integrated circuit of claim 14, wherein the second LDO regulator further comprises output circuits configured to output enable control signals to be applied to the plurality of auxiliary current generation circuits, each of the output circuits comprises a pull-up transistor and a pull-down transistor connected to each other through a node through which the enable control signal is output, and a ratio of a length to a width of the pull-up transistor differs from a ratio of a length to a width of the pull-down transistor.

16. The integrated circuit of claim 15, wherein the ratio of the length to the width of the pull-up transistor differs in the output circuits.

17. An integrated circuit comprising:

a first low drop-output (LDO) regulator configured to generate a first load current from a first power source voltage;

a second LDO regulator configured to selectively generate a second load current from a second power source voltage; and a system load configured to draw a third load current including at least one of the first and second load currents from an output node shared by the first and second LDO regulators, wherein the first LDO regulator comprises:

a first current generation circuit configured to generate the first load current by applying the first power source voltage thereto; and a first comparison circuit configured to generate a first enable control signal by comparing a reference voltage with a feedback voltage corresponding to a voltage of the output node and provide the first enable control signal to the first current generation circuit, and the second LDO regulator comprises:

a second current generation circuit configured to generate the second load current by applying the second power source voltage thereto; and a second comparison circuit connected to internal nodes of the first comparison circuit and configured to generate a second enable control signal by comparing voltages of the internal nodes and provide the second enable control signal to the second current generation circuit.

18. The integrated circuit of claim 17, wherein the internal nodes comprise first and second internal nodes, a voltage of the first internal node corresponds to a positive comparison result between the feedback voltage and the reference voltage, and a voltage of the second internal node corresponds to a negative comparison result between the feedback voltage and the reference voltage.

19. The integrated circuit of claim 17, wherein the second current generation circuit comprises a plurality of auxiliary current generation circuits, each configured to generate an auxiliary current included in the second load current, and the second enable control signal comprises a plurality of third enable control signals provided to the plurality of auxiliary current generation circuits.

20. The integrated circuit of claim 19, wherein a number of auxiliary current generation circuits enabled in response to the plurality of third enable control signals is determined based on a magnitude of a difference between the internal nodes.

* * * * *